United States Patent
Nakamoto

(10) Patent No.: US 12,155,956 B2
(45) Date of Patent: Nov. 26, 2024

(54) SOLID-STATE IMAGING ELEMENT AND IMAGING DEVICE WITH CURRENT FEEDBACK TO INPUT TRANSISTOR THAT RECEIVES PIXEL CIRCUIT INPUT VOLTAGE

(71) Applicant: Sony Semiconductor Solutions Corporation, Kanagawa (JP)

(72) Inventor: Eiichi Nakamoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 29 days.

(21) Appl. No.: 17/795,119

(22) PCT Filed: Nov. 2, 2020

(86) PCT No.: PCT/JP2020/041097
§ 371 (c)(1),
(2) Date: Jul. 25, 2022

(87) PCT Pub. No.: WO2021/157148
PCT Pub. Date: Aug. 12, 2021

(65) Prior Publication Data
US 2023/0066061 A1 Mar. 2, 2023

(30) Foreign Application Priority Data
Feb. 3, 2020 (JP) .................. 2020-016078

(51) Int. Cl.
*H04N 25/778* (2023.01)
*H04N 25/75* (2023.01)
(52) U.S. Cl.
CPC .......... *H04N 25/778* (2023.01); *H04N 25/75* (2023.01)

(58) Field of Classification Search
CPC ...... H04N 25/778; H04N 25/75; H04N 25/79; H04N 25/78; H04N 25/77
See application file for complete search history.

(56) References Cited

U.S. PATENT DOCUMENTS

| 2011/0109392 A1 | 5/2011 | Park et al. |
| 2013/0087685 A1* | 4/2013 | Itano ...................... H04N 25/67 250/208.1 |

(Continued)

FOREIGN PATENT DOCUMENTS

| JP | 2010-147614 A | 7/2010 |
| JP | 2016-5054 A | 1/2016 |
| JP | 2016181884 A | 10/2016 |

OTHER PUBLICATIONS

International Search Report (PCT/ISA/210), International Application No. PCT/JP2020/041097, dated Jan. 19, 2021.

*Primary Examiner* — Padma Haliyur
(74) *Attorney, Agent, or Firm* — Michael Best & Friedrich LLP

(57) ABSTRACT

Power consumption is reduced in a solid-state imaging element that amplifies a voltage for each column.
The solid-state imaging element includes a pixel circuit, an input transistor, a reference side current source, and a feedback circuit. The pixel circuit generates an input voltage by photoelectric conversion. The input transistor outputs an output voltage depending on a voltage between a source to which the input voltage is input and a gate from a drain. The reference side current source is connected to a reference node at a predetermined reference voltage and supplies a predetermined current. The feedback circuit feeds back a part of the current to the gate of the input transistor.

14 Claims, 30 Drawing Sheets

(56) References Cited

U.S. PATENT DOCUMENTS

| | | |
|---|---|---|
| 2013/0169364 A1 | 7/2013 | Cha et al. |
| 2015/0256777 A1* | 9/2015 | Ishii ................. H04N 25/65 250/208.1 |
| 2017/0272667 A1* | 9/2017 | Hynecek ............... H04N 25/57 |
| 2018/0103222 A1* | 4/2018 | Yan ................. H01L 27/14614 |
| 2020/0275041 A1* | 8/2020 | Higuchi ................. H03M 1/66 |

* cited by examiner

Fig. 28

| | COMPARATOR A (LOW VOLTAGE) | | COMPARATOR A (HIGH VOLTAGE) | | CRCA+A | | MFC-CRCA+A | |
|---|---|---|---|---|---|---|---|---|
| ANALOG GAIN | 8 | 1 | 8 | 1 | 8 | 1 | 8 | 1 |
| INPUT CONVERSION NOISE | 3.23E-15 | 6.76E-15 | 1.57E-15 | 1.57E-15 | 9.09E-16 | 7.17E-15 | 1.20E-15 | 4.99E-15 |
| SNR | 52.87 | 67.72 | 58.00 | 74.06 | 53.66 | 62.75 | 58.01 | 67.88 | ns
SOLID-STATE IMAGING ELEMENT AND IMAGING DEVICE WITH CURRENT FEEDBACK TO INPUT TRANSISTOR THAT RECEIVES PIXEL CIRCUIT INPUT VOLTAGE

TECHNICAL FIELD

The present technology relates to a solid-state imaging element. More specifically, the present technology relates to a solid-state imaging element that converts an analog signal into a digital signal for each column, and an imaging device.

BACKGROUND ART

Conventionally, in a solid-state imaging element and the like, various analog-to-digital converters (ADCs) such as a single slope type have been used in order to convert an analog signal into a digital signal. When such an ADC is disposed for each column, a current source is generally connected to a node on a ground side of a vertical signal line arranged along a column, and an analog signal from the node is input to the ADC. For example, for the purpose of amplifying a voltage, a solid-state imaging element in which an amplifier is inserted between an ADC and a node between a vertical signal line and a current source has been proposed (refer to PTL 1, for example).

CITATION LIST

Patent Literature

[PTL 1]
JP 2016-5054 A

SUMMARY

Technical Problem

In the above-described conventional technology, the voltage of an analog signal is amplified by inserting an amplifier. However, it is necessary to provide a current source on the power supply side of the amplifier in addition to the current source on the ground side of vertical signal lines in order to drive the amplifier. Due to addition of the current source on the power supply side, power consumption may increase as compared to a case where the voltage is not amplified.

An object of the present technology in view of such circumstances is to reduce power consumption in a solid-state imaging element that amplifies a voltage for each column.

Solution to Problem

The present technology has been devised to solve the above-mentioned problems, and a first aspect thereof is a solid-state imaging element including a pixel circuit that generates an input voltage by photoelectric conversion, an input transistor that outputs an output voltage depending on a voltage between a source to which the input voltage is input and a gate from a drain, a reference side current source that is connected to a reference node at a predetermined reference voltage and supplies a predetermined current, and a feedback circuit that feeds back a part of the current to the gate of the input transistor. Accordingly, the effect of amplifying the input voltage only by the current of the reference side current source is obtained.

Further, in the first aspect, the feedback circuit may include a feedback capacitance inserted between an output node through which the output voltage is output and the gate, a reference side capacitance inserted between the gate and the reference node at the reference voltage, and an input side auto-zero switch that opens and closes a path between the gate and the output node. Accordingly, the effect of obtaining a closed-loop gain determined by values of the feedback capacitance and the reference side capacitance is obtained.

Further, in the first aspect, the solid-state imaging element may further include a cascode transistor inserted between the reference side current source and the drain, and a cascode capacitance inserted between the source of the input transistor and a gate of the cascode transistor, and the output node may be a node between the cascode transistor and the reference side current source. Accordingly, the effect of improving linearity is obtained.

Further, in the first aspect, the solid-state imaging element may further include a power supply side current source connected to a power supply node at a predetermined power supply voltage, and a pair of cascode transistors inserted between the power supply side current source and the reference side current source, and the output node may be a node between the pair of cascode transistors. Accordingly, the effect of extending an output range is obtained.

Further, in the first aspect, the solid-state imaging element may further include an intermediate switch that opens and closes a path between the feedback capacitance and the output node, and a reference switch that opens and closes a path between the feedback capacitance and a node at a predetermined reference voltage. Accordingly, the effect of extending the output range depending on the reference voltage is obtained.

Further, in the first aspect, the solid-state imaging element may further include a cascode capacitance connected to the power supply node at the power supply voltage, an output side auto-zero switch that opens and closes a path between the cascode capacitance and the output node, and an intermediate switch, and the reference side current source may include a first reference side current source transistor and a second reference side current source transistor, the first reference side current source transistor may be inserted between the input transistor and the reference node, the second reference side current source transistor may be inserted between one of the pair of cascode transistors and the reference node at the reference voltage, and the intermediate switch may open and close a path between a node between the input transistor and the first reference side current source transistor and a node between one of the pair of cascode transistors and the second reference side current source transistor. Accordingly, the effect of extending the output range is obtained.

Further, in the first aspect, the solid-state imaging element may further include a boost side current source connected to a power supply node at a predetermined power supply voltage, a boost transistor inserted between the boost side current source and the reference node at the reference voltage and having a gate connected to an output node through which the output voltage is output, and a boost side capacitance inserted between a node between the boost side current source and the boost transistor and the source. Accordingly, the effect of reducing a time required for settling is obtained.

Further, a second aspect of the present technology is an imaging device including a pixel circuit that generates an input voltage by photoelectric conversion, an input transistor that outputs an output voltage depending on a voltage between a source to which the input voltage is input and a gate from a drain, a reference side current source that is connected to a node at a predetermined reference voltage and supplies a predetermined current, a feedback circuit that feeds back a part of the current to the gate of the input transistor, and an analog-to-digital converter that converts the output voltage into a digital signal. Accordingly, the effect of amplifying the input voltage only by the current of the reference side current source and converting the output voltage after the amplification into a digital signal is obtained.

BRIEF DESCRIPTION OF DRAWINGS

FIG. 28 is a diagram showing an example of noise characteristics in the comparative example and the first to fifth embodiments of the present technology.

DESCRIPTION OF EMBODIMENTS

Modes for implementing the present technology (hereinafter also referred to as embodiments) will be described hereinafter. The descriptions will be given in the following order.

1. First embodiment (example in which input transistor and feedback circuit are provided)
2. Second embodiment (example in which cascode transistor, input transistor, and feedback circuit are provided)
3. Third embodiment (example in which input transistor and feedback circuit are provided and folded stage is added)
4. Fourth embodiment (example in which input transistor, feedback circuit, and folded stage are provided and individually initialized)
5. Fifth Embodiment (example in which input transistor and feedback circuit are provided and boost circuit is added)
6. Example of application to moving body

1. First Embodiment

[Configuration Example of Imaging Device]

Figure 1:
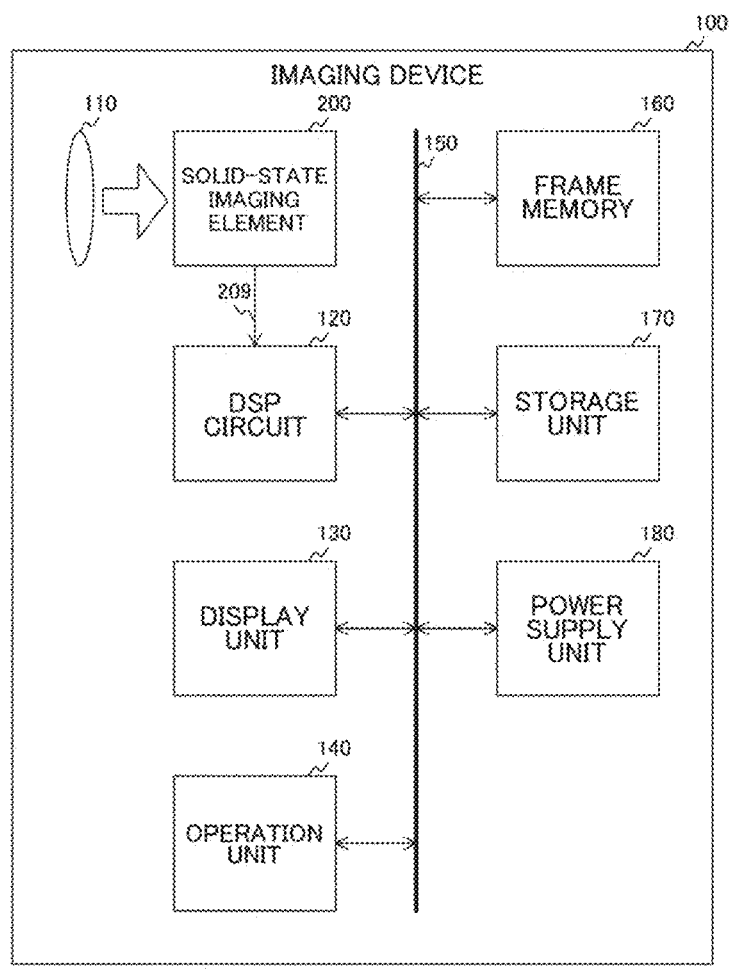
FIG. 1 is a block diagram showing a configuration example of an imaging device in a first embodiment of the present technology.

FIG. 1 is a block diagram showing a configuration example of an imaging device 100 in a first embodiment of the present technology. This imaging device 100 is a device for capturing image data (frame) and includes an optical unit 110, a solid-state imaging element 200, and a digital signal processing (DSP) circuit 120. Further, the imaging device 100 includes a display unit 130, an operation unit 140, a bus 150, a frame memory 160, a storage unit 170, and a power supply unit 180. As the imaging device 100, for example, a smartphone, a personal computer, an in-vehicle camera, or the like having an imaging function is conceivable in addition to a digital camera such as a digital still camera.

The optical unit 110 focuses light from a subject and guides the light to the solid-state imaging element 200. The solid-state imaging element 200 generates a frame by photoelectric conversion in synchronization with a vertical synchronization signal. Here, the vertical synchronization signal is a periodic signal having a predetermined frequency that indicates an imaging timing. The solid-state imaging element 200 supplies generated image data to the DSP circuit 120 via a signal line 209.

The DSP circuit 120 executes predetermined signal processing on a frame from the solid-state imaging element 200. The DSP circuit 120 outputs the processed frame to the frame memory 160 and the like via the bus 150.

The display unit 130 displays a frame. As the display unit 130, for example, a liquid crystal panel or an organic EL (Electro Luminescence) panel may be conceived. The operation unit 140 generates an operation signal according to an operation of a user.

The bus 150 is a common path through which the optical unit 110, the solid-state imaging element 200, the DSP circuit 120, the display unit 130, the operation unit 140, the frame memory 160, the storage unit 170, and the power supply unit 180 exchange data with each other.

The frame memory 160 holds image data. The storage unit 170 stores various types of data, such as a frame. The power supply unit 180 supplies power to the solid-state imaging element 200, the DSP circuit 120, the display unit 130, and the like.

[Configuration Example of Solid-State Imaging Element]

Figure 2:
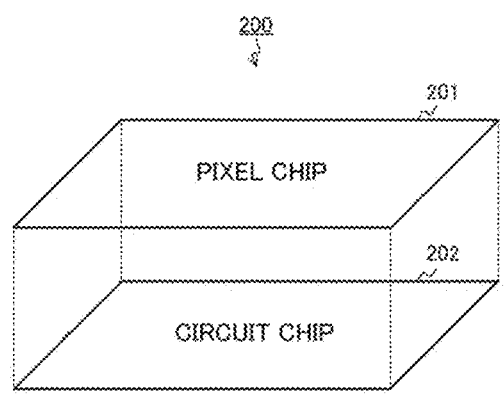
FIG. 2 is a diagram showing an example of a laminated structure of a solid-state imaging element in the first embodiment of the present technology.

FIG. 2 is a diagram showing an example of a laminated structure of the solid-state imaging element 200 in the first embodiment of the present technology. The solid-state imaging element 200 includes a circuit chip 202 and a pixel chip 201 laminated on the circuit chip 202. These chips are electrically connected via a connection part such as a via. In addition to the via, the chips can also be connected by Cu—Cu bonding or bumps.

Figure 3:
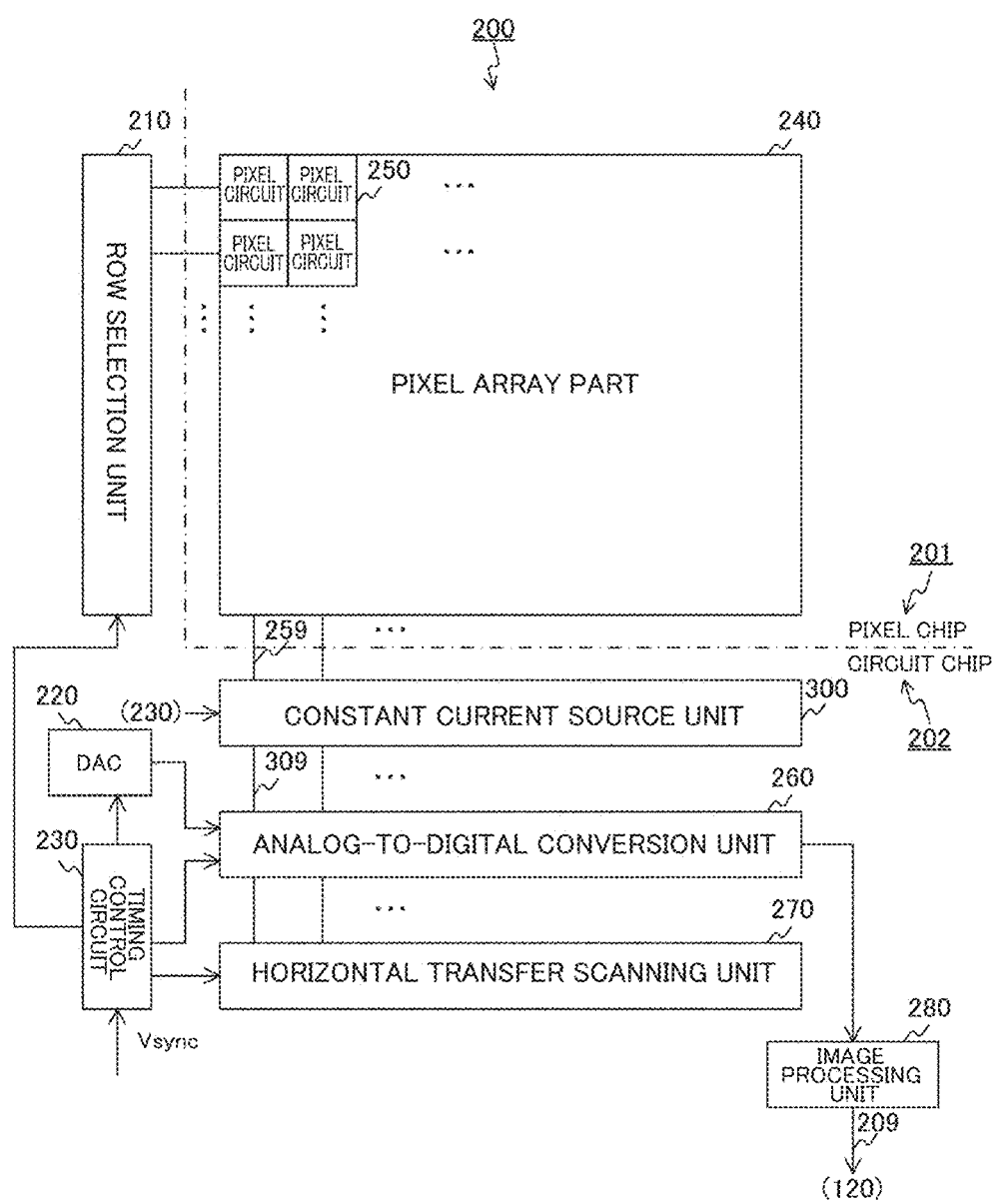
FIG. 3 is a block diagram showing a configuration example of the solid-state imaging element in the first embodiment of the present technology.

FIG. 3 is a block diagram showing a configuration example of the solid-state imaging element 200 in the first embodiment of the present technology. The solid-state imaging element 200 includes a row selection unit 210, a digital-to-analog converter (DAC) 220, and a timing control circuit 230. Further, the solid-state imaging element 200 includes a pixel array part 240, a constant current source unit 300, an analog-to-digital conversion unit 260, a horizontal transfer scanning unit 270, and an image processing unit 280.

Further, a plurality of pixel circuits 250 are arranged in a two-dimensional grid pattern in the pixel array part 240. Hereinafter, a set of pixel circuits 250 arranged in a predetermined horizontal direction is referred to as a "row", and a set of pixel circuits 250 arranged in a direction perpendicular to the horizontal direction is referred to as a "column".

The timing control circuit 230 controls operation timings of the row selection unit 210, the DAC 220, the constant current source unit 300, the analog-to-digital conversion unit 260, and the horizontal transfer scanning unit 270 in synchronization with a vertical synchronization signal Vsync.

The row selection unit 210 sequentially selects and drives rows and outputs an analog pixel signal to the analog-to-digital conversion unit 260 via the constant current source unit 300.

The pixel circuits 250 generate analog pixel signals by photoelectric conversion under the control of the row selection unit 210. Each pixel circuit 250 outputs a pixel signal to the constant current source unit 300 via a vertical signal line 259.

A constant current is supplied to each column in the constant current source unit 300. Further, a column amplifier for amplifying a pixel signal is provided for each column.

The DAC 220 generates a reference signal by digital-to-analog (DA) conversion and supplies the reference signal to the analog-to-digital conversion unit 260. As the reference signal, for example, a saw blade-shaped ramp signal is used.

The analog-to-digital conversion unit 260 converts an analog input signal into a digital signal for each column using the reference signal. The analog-to-digital conversion unit 260 supplies the digital signal to the image processing unit 280 under the control of the horizontal transfer scanning unit 270.

The horizontal transfer scanning unit 270 controls the analog-to-digital conversion unit 260 to output digital signals in order.

The image processing unit 280 performs predetermined image processing on a frame in which digital signals are arranged. The image processing unit 280 supplies the processed frame to the DSP circuit 120.

Further, the above-described circuits in the solid-state imaging element 200 are distributed and disposed in the pixel chip 201 and the circuit chip 202. For example, the pixel array part 240 is provided in the pixel chip 201, and circuits (the analog-to-digital conversion unit 260 and the like) other than the pixel array part 240 are disposed in the circuit chip 202. The circuits disposed in the pixel chip 201 and the circuit chip 202 are not limited to this combination. For example, the pixel array part 240, the constant current source unit 300, and a comparator in the analog-to-digital conversion unit 260 may be disposed in the pixel chip 201, and other circuits may be disposed in the circuit chip 202.

[Configuration Example of Pixel Circuit]

Figure 4:
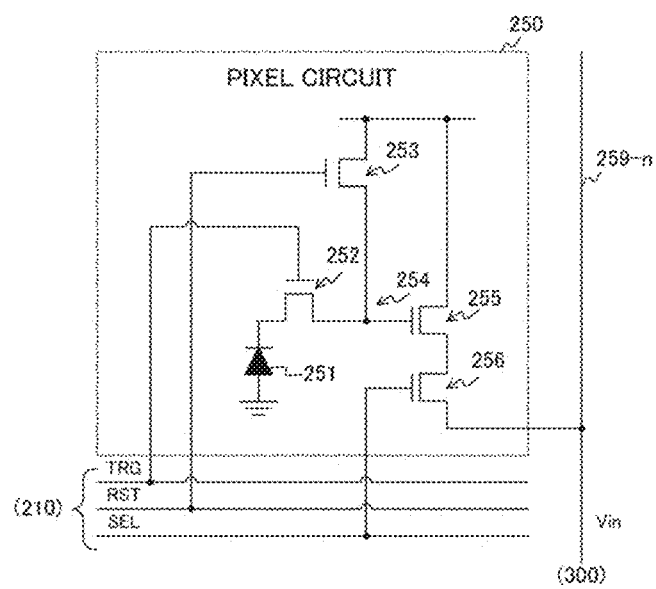
FIG. 4 is a circuit diagram showing a configuration example of a pixel circuit in the first embodiment of the present technology.

FIG. 4 is a circuit diagram showing a configuration example of the pixel circuit 250 in the first embodiment of the present technology. The pixel circuit 250 includes a photoelectric conversion element 251, a transfer transistor 252, a reset transistor 253, a floating diffusion layer 254, an amplification transistor 255, and a select transistor 256.

The photoelectric conversion element 251 photoelectrically converts incident light to generate charge. The transfer transistor 252 transfers charge from the photoelectric conversion element 251 to the floating diffusion layer 254 according to a transfer signal TRG from the row selection unit 210. The reset transistor 253 initializes an charge amount of the floating diffusion layer 254 according to a reset signal RST from the row selection unit 210.

The floating diffusion layer 254 accumulates charge and generates a voltage according to the amount of charge. The amplification transistor 255 amplifies the voltage of the floating diffusion layer 254. The select transistor 256 outputs an amplified voltage signal as a pixel signal SIG according to a select signal SEL from the row selection unit 210. On the assumption that the number of columns is N (N is an integer), a pixel signal of an n-th (n is an integer of 1 to N) column is transmitted to the constant current source unit 300 via a vertical signal line 259-$n$.

The circuit of the pixel circuit 250 is not limited to the one illustrated in the figure as long as it can generate a pixel signal by photoelectric conversion.

[Configuration Example of Constant Current Source Unit]

Figure 5:
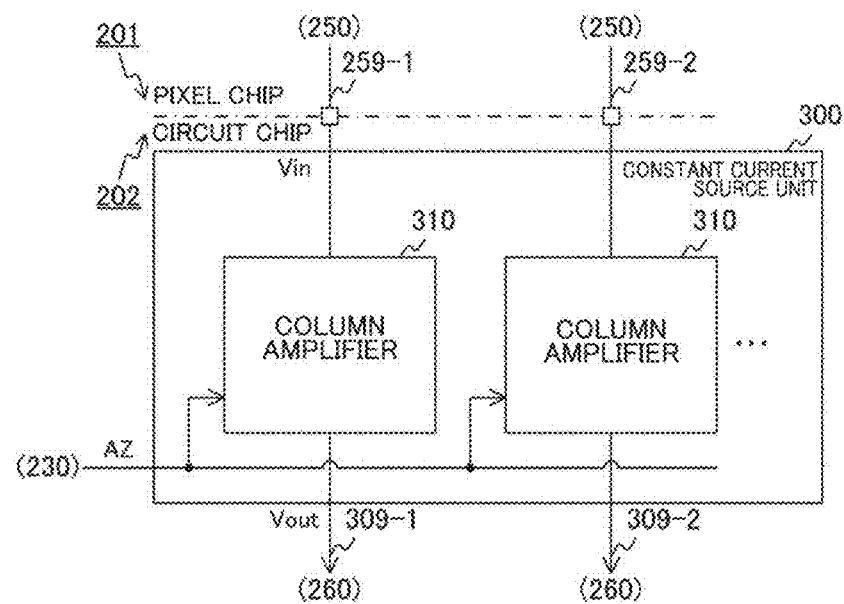
FIG. 5 is a block diagram showing a configuration example of a constant current source unit in the first embodiment of the present technology.

FIG. 5 is a block diagram showing a configuration example of the constant current source unit 300 in the first embodiment of the present technology. A column amplifier 310 is disposed for each column in the constant current source unit 300. When the number of columns is N, N column amplifiers 310 are disposed.

A pixel signal of the corresponding column is input to the nth column amplifier 310 via the vertical signal line 259-n. The column amplifier 310 amplifies the voltage of the pixel signal and outputs the same to the analog-to-digital conversion unit 260 via a signal line 309-n. Hereinafter, a voltage before amplification of a pixel signal is referred to as an "input voltage Vin", and a voltage after amplification is referred to as an "output voltage Vout". Further, the column amplifier 310 is initialized by an auto-zero signal AZ from the timing control circuit 230.

[Configuration Example of Column Amplifier]

Figure 6:
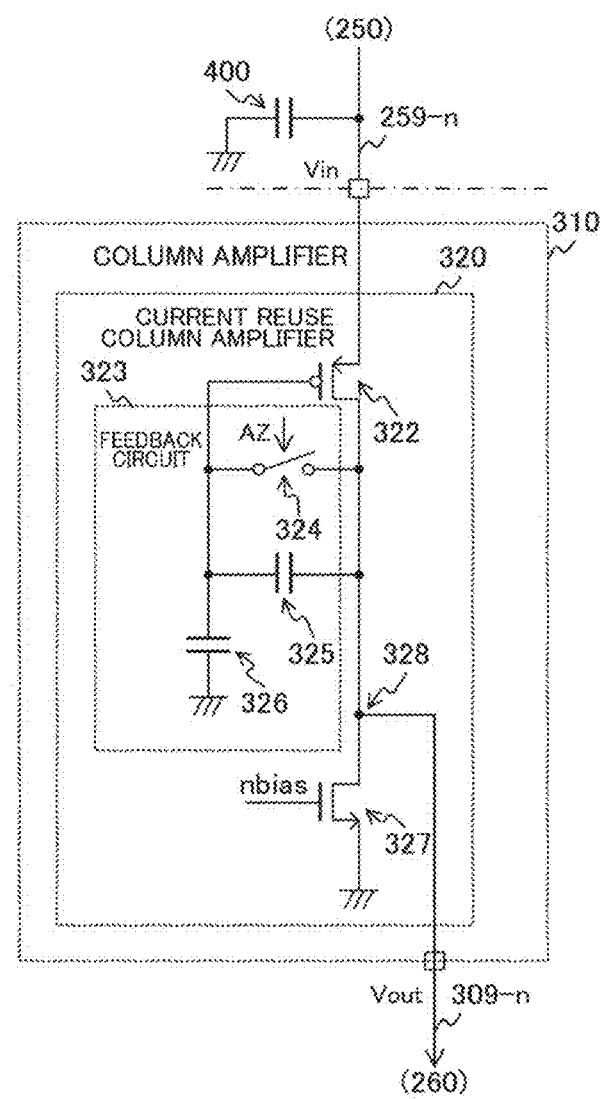
FIG. 6 is a circuit diagram showing a configuration example of a column amplifier in the first embodiment of the present technology.

FIG. 6 is a circuit diagram showing a configuration example of the column amplifier 310 in the first embodiment of the present technology. The column amplifier 310 is provided with a current reuse column amplifier 320. Hereinafter, the current reuse column amplifier 320 will be referred to as "CRCA (Current Reuse Column Amp)". This CRCA includes an input transistor 322, a feedback circuit 323, and a reference side current source transistor 327. The feedback circuit 323 includes an input side auto-zero switch 324, a feedback capacitance 325, and a reference side capacitance 326. Further, in the figure, a VSL capacitance 400 connected to the vertical signal line 259-n indicates wiring capacitance between the vertical signal line 259-n and a reference voltage (ground voltage, or the like).

Further, as the input transistor 322, for example, a p-channel metal oxide semiconductor (pMOS) transistor may be used. As the reference side current source transistor 327, for example, an n-channel MOS (nMOS) transistor may be used.

The source of the input transistor 322 is connected to the vertical signal line 259-n, and the drain is connected to the drain of the reference side current source transistor 327. Further, the pixel circuit 250 generates a pixel signal by photoelectric conversion and inputs the voltage of the pixel signal to the source of the input transistor 322 as an input voltage Vin via the vertical signal line 259-n.

Further, the source of the reference side current source transistor 327 is connected to a reference node of a predetermined reference voltage (ground voltage or the like). A predetermined bias voltage nbias is applied to the gate of the reference side current source transistor 327, and the reference side current source transistor 327 supplies a constant bias current corresponding to the bias voltage nbias. The reference side current source transistor 327 is an example of a reference side current source described in the claims.

Further, the output voltage Vout is output from an output node 328 between the input transistor 322 and the reference side current source transistor 327 to the analog-to-digital conversion unit 260 via the signal line 309-n.

In the feedback circuit 323, the feedback capacitance 325 is inserted between the output node 328 and the gate of the input transistor 322. Further, the reference side capacitance 326 is inserted between the gate of the input transistor 322 and the reference node of the reference voltage. The input side auto-zero switch 324 opens and closes the path between the output node 328 and the gate of the input transistor 322 according to the auto-zero signal AZ.

With the above-described configuration, a gate-source voltage $V_{GS}$ of the input transistor 322 fluctuates according to the input voltage Vin input to the source of the input transistor 322, and a drain current of the input transistor 322 changes. The output voltage Vout corresponding to the drain current is output from the drain of the input transistor 322 (that is, the output node 328). In this way, the output voltage corresponding to the gate-source voltage of the input transistor 322 is output from the drain. Further, a part of the constant bias current supplied by the reference side current source transistor 327 is fed back to the gate of the input transistor 322 by the feedback circuit 323.

[Configuration Example of Analog-to-Digital Conversion Unit]

Figure 7:
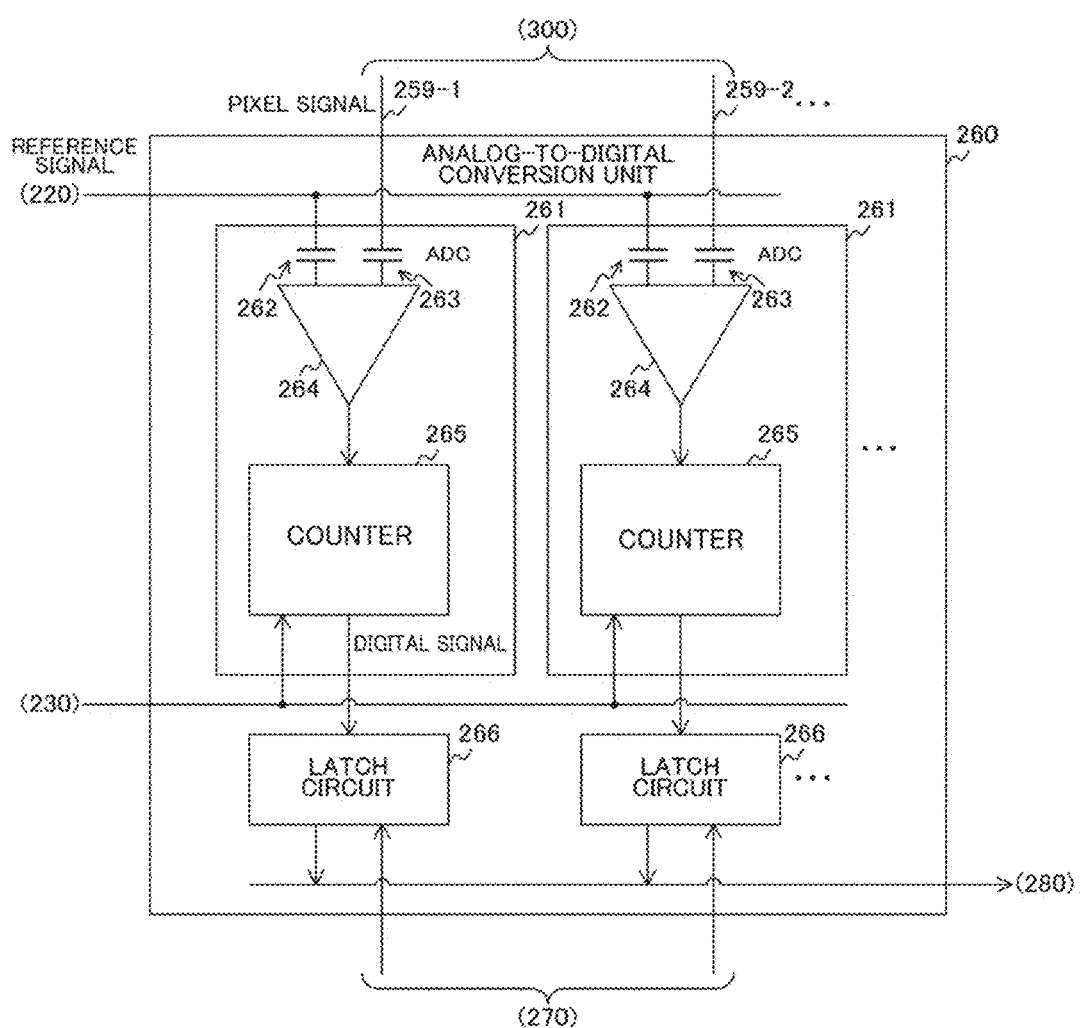
FIG. 7 is a block diagram showing a configuration example of an analog-to-digital conversion unit in the first embodiment of the present technology.

FIG. 7 is a block diagram showing a configuration example of the analog-to-digital conversion unit 260 in the first embodiment of the present technology. An ADC 261 and a latch circuit 266 are disposed for each column in the analog-to-digital conversion unit 260. When the number of columns is N, N ADCs 261 and N latch circuits 264 are disposed.

The ADC 261 converts an analog pixel signal into a digital signal. The ADC 261 includes capacitances 262 and 263, a comparator 264, and a counter 265. Further, the ADC 261 further executes correlated double sampling (CDS) processing.

The comparator 264 compares the reference signal from the DAC 220 with a pixel signal of the corresponding column. The comparator 264 is provided with a pair of input terminals, the reference signal is input to one of the input terminals via the capacitance 262, and a pixel signal is input to the other via the capacitance 263. The comparator 264 supplies a comparison result to the counter 265.

The counter 265 counts a count value over a period until the comparison result is inverted according to control of the timing control circuit 230. The counter 265 outputs a signal indicating the count value to the latch circuit 266 as a digital signal.

The latch circuit 266 holds a digital signal. The latch circuit 266 outputs a digital signal to the image processing unit 280 in synchronization with a synchronization signal from the horizontal transfer scanning unit 270.

Figure 8:
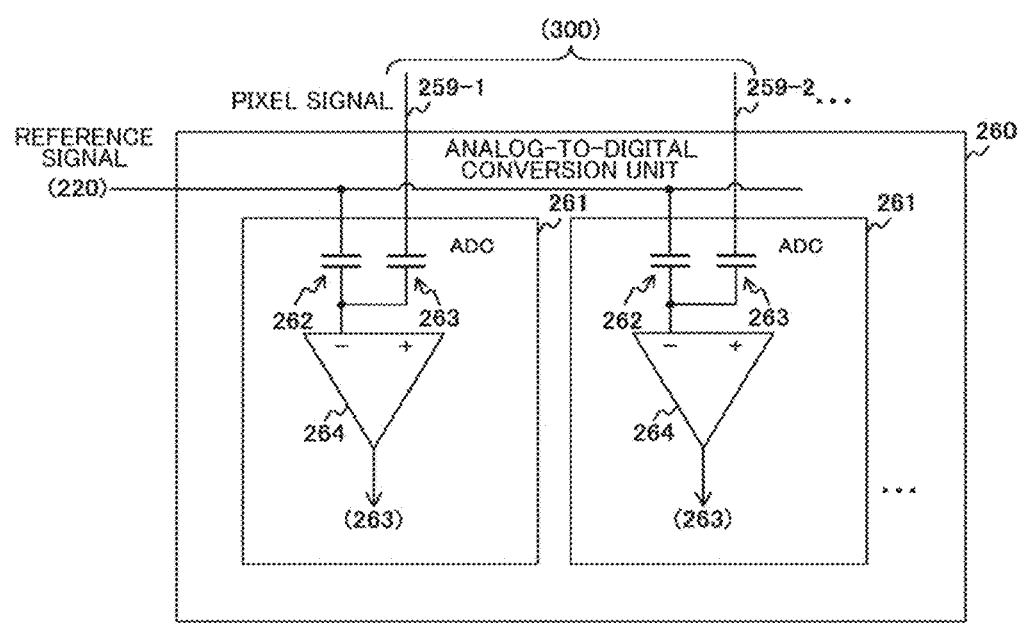
FIG. 8 is a block diagram showing another example of an ADC in the first embodiment of the present technology.

As illustrated in FIG. 8, in the ADC 261, the capacitances 262 and 263 may be connected in parallel to one (such as an inverting input terminal) of the input terminals of the comparator 264. Accordingly, the voltage of the comparator 264 can be reduced as compared to FIG. 7.

[Operation Example of Column Amplifier]

Figure 9:
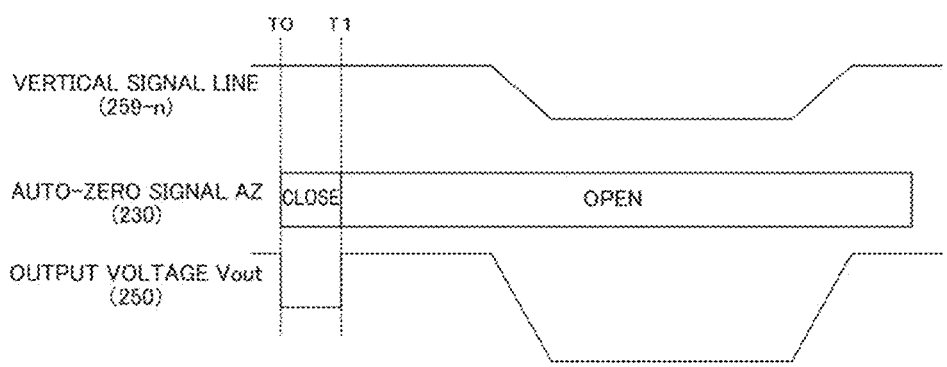
FIG. 9 is a timing chart showing an example of an operation of the column amplifier in the first embodiment of the present technology.

FIG. 9 is a timing chart showing an example of the operation of the column amplifier 310 in the first embodiment of the present technology. At a timing T0 at which the voltage of the vertical signal line 259-n is initialized, the timing control circuit 230 controls the input side auto-zero switch 324 such that it switches to a closed state according to the auto-zero signal AZ. Accordingly, an initial voltage stored in each of the feedback capacitance 325 and the reference side capacitance 326 is determined.

Then, at a timing Ti after a predetermined pulse period has elapsed, the timing control circuit 230 controls the input side auto-zero switch 324 such that it switches to an open state according to the auto-zero signal AZ. When a voltage of the floating diffusion layer generated by photoelectric conversion lowers the gate voltage of the amplification transistor 255, the amount of current supplied to the vertical signal line 259-n decreases and the voltage of the vertical signal line 259-n (that is, the input voltage Vin) also decreases. Due to the decrease in the input voltage Vin, the gate-source voltage $V_{GS}$ of the input transistor 322 decreases, and the current is further reduced. Here, since the reference side current source transistor 327 continues to draw a constant current, the amount of decrease in the current from the vertical signal line 259-n is drawn from the output side. Further, change in the output voltage Vout is negatively fed back to the input transistor 322 through the feedback capacitance 325 and the reference side capacitance 326. A closed loop gain g thus obtained is represented by the following formula.

$$g=(C_F+C_S)/C_F$$

In the above formula, $C_F$ indicates the capacitance value of the feedback capacitance 325 and $C_S$ indicates the capacitance value of the reference side capacitance 326.

Since the current reuse column amplifier 320 performs amplification using the relatively large current of the vertical signal line 259-n as a bias, it can efficiently perform amplification, which leads to power reduction. In addition, capacitance used can be reduced as compared to a comparative example of an inverting amplification type which will be described later, and thus a circuit area can also be reduced.

Figure 10:
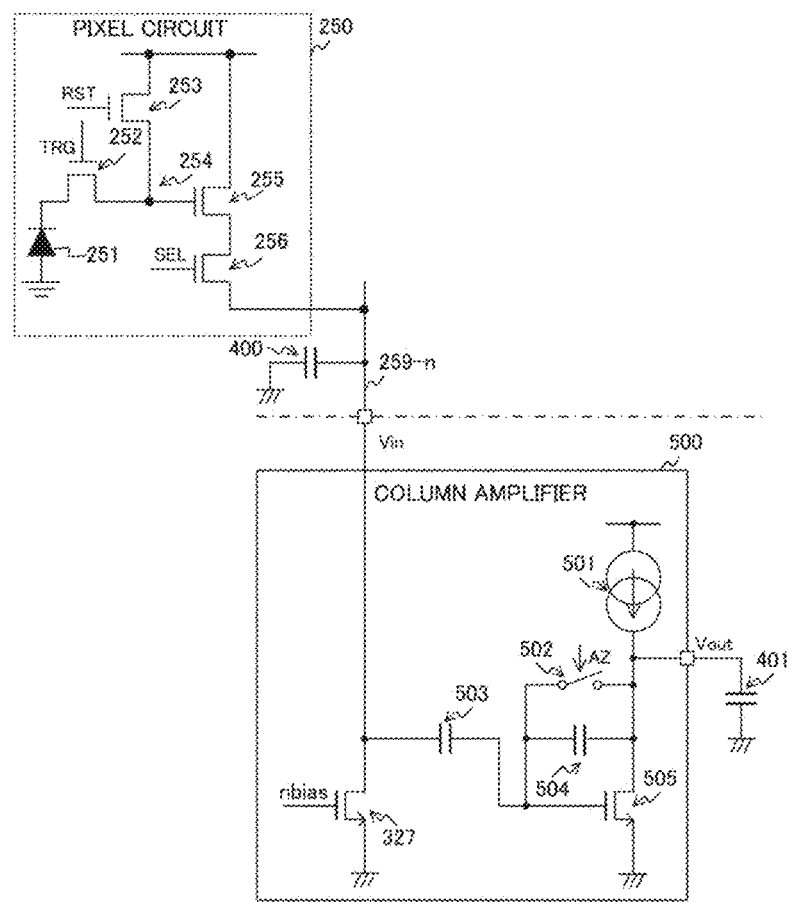
FIG. 10 is a circuit diagram showing a configuration example of a column amplifier in a comparative example.

FIG. 10 is a circuit diagram showing a configuration example of a column amplifier 500 in a comparative example. In the column amplifier 500 of this comparative example, a current source 501 and an input transistor 505 are connected in series to a power supply, and an output voltage Vout is output from a node therebetween. The gate of the input transistor 505 is connected to the vertical signal line 259-n via a capacitance 503, and a feedback capacitance 504 is inserted between the source and the gate. Further, an auto-zero switch 502 opens and closes the path between the source and the gate of the input transistor 505. A load capacitance 401 connected to the output terminal indicates capacitance of a circuit (ADC or the like) subsequent to the column amplifier 500.

The column amplifier 500 serves to correctly amplify the signal of the vertical signal line 259-n and transmit the amplified signal to the ADC of the next stage. When the signal of the vertical signal line 259-n is small, noise requirements of the ADC can be alleviated by amplifying the signal. When the signal is large, the amplification factor may be curbed by switching the magnitude of the capacitance. In this manner, a wide range of signals can be handled with the ADC having specifications that are not so high. An amplifier such as the column amplifier 500 suppresses noise in the subsequent stage, but it should be noted that the amplifier itself generates noise. Although a general single-ended inverting amplifier is adopted as the column amplifier 500 in the figure, it is necessary to cause a sufficient current to flow to secure a transconductance Gm of the input transistor 505 in order to suppress noise. For example, when a current of the same degree as the current of the reference side current source transistor 327 (hereinafter referred to as a "load MOS") flows, the transconductance Gm of the input transistor 505 becomes equal to or greater than that of the load MOS, and thus a column amplifier having sufficiently low noise is obtained.

Figure 11:
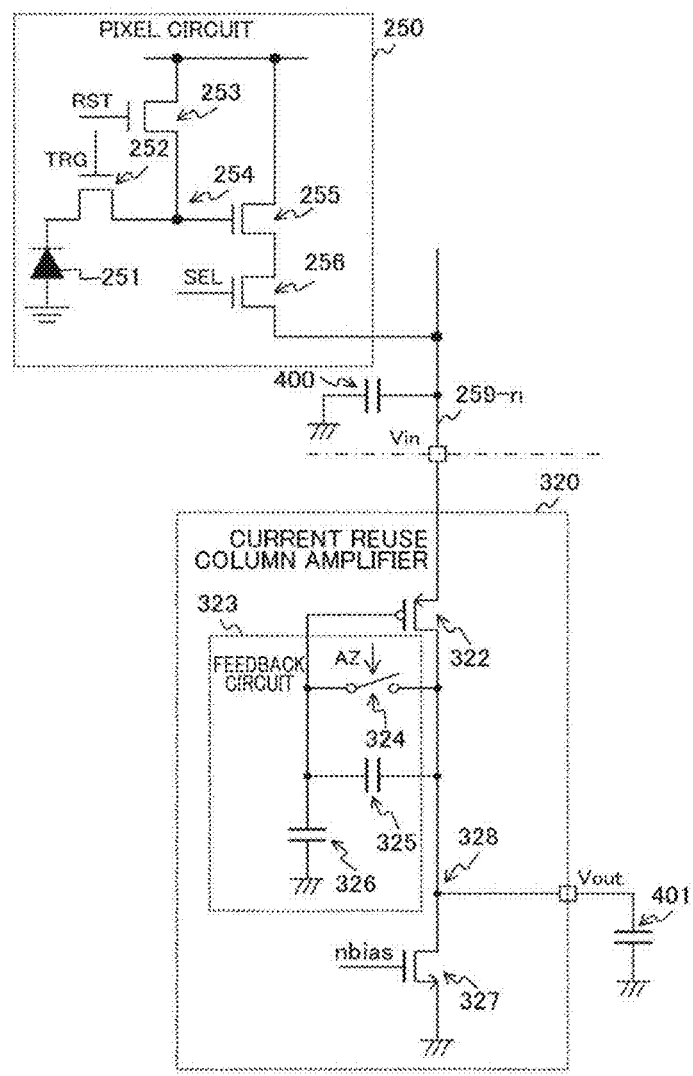
FIG. 11 is a circuit diagram showing a configuration example of a current reuse column amplifier in the first embodiment of the present technology.

FIG. 11 is a circuit diagram showing a configuration example of the current reuse column amplifier 320 in the first embodiment of the present technology. The column amplifier 500 of the comparative example consumes as much current as the current of the load MOS (that is, the reference side current source transistor 327) in order to obtain a large transconductance Gm. On the other hand, in the current reuse column amplifier 320, the column amplifier can be created only by the current of the load MOS, and thus electric power can be halved as compared to the column amplifier 500 of the comparative example in principle.

In order to compare the CRCA illustrated in the figure with the case where there is no column amplifier and only the load MOS is present, each test circuit was made and characteristics were investigated by simulation. The conditions of the test circuit are as follows.

Transconductance of amplification transistor 255: 25 microsiemens (μS)
Bias current: 4 microamperes (μA)
VSL capacitance: 2 picofarads (pF)
Reference side capacitance value: 1.05 picofarad (pF)
Feedback capacitance value: 150 femtofarad (fF)
Load capacitance value: 300 femtofarad (fF)
Input transistor size: 32 u/1 u (LVT: Low Threshold Voltage)

Figure 12:
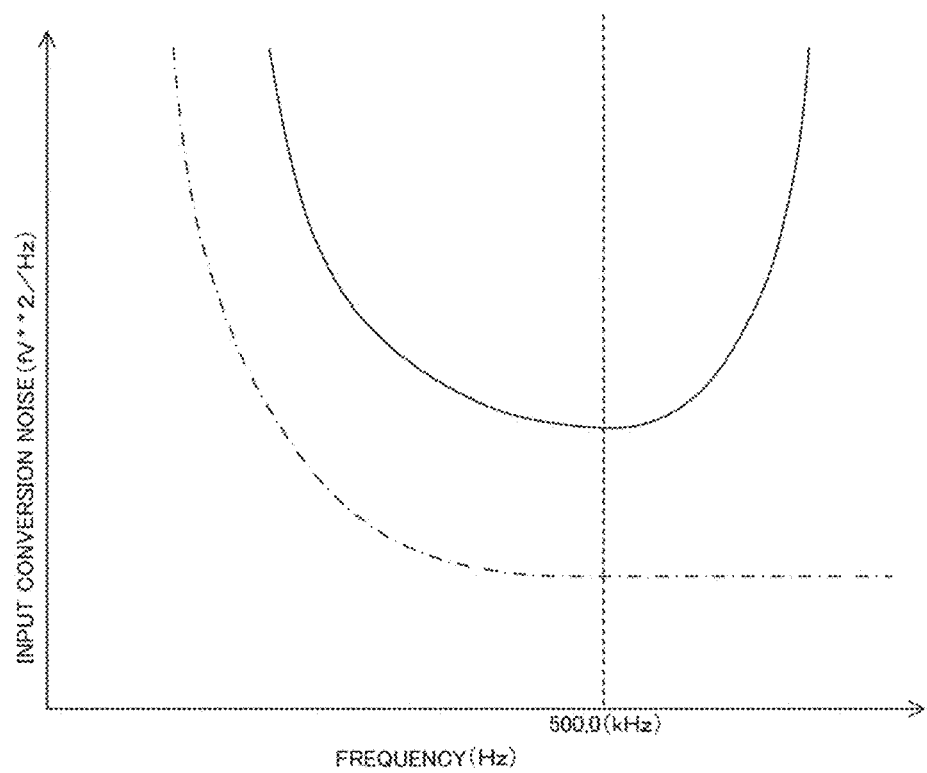
FIG. 12 is a graph showing an example of input-converted noise frequency distributions in the first embodiment of the present technology and the comparative example.

FIG. 12 shows frequency distributions of input conversion noise. In the figure, the vertical axis represents input conversion noise, and the horizontal axis represents frequency. The alternate long and short dash line indicates a frequency distribution of only the load MOS, and the solid line indicates a frequency distribution of the CRCA. The input conversion noise is conversion noise at the input of the pixel amplifier (that is, the gate of the amplification transistor 255), and noise of the pixel amplifier is not taken into consideration. In the solid-state imaging element, low-frequency flicker noise is canceled by CDS processing and high-frequency noise is band-limited in the subsequent stage, and thus mid-range (500 kHz) floor noise is focused. The conversion noise of the CRCA at 500 kHz is almost doubled as compared to the load MOS alone. This is because noise of the added pMOS (input transistor 322) increases and the input conversion noise of the load MOS also increases. Although the noise seems to have deteriorated only by this result, noise of the subsequent stage (comparator) can be suppressed to $1/8^2$ by obtaining a gain, and total noise is reduced depending on the noise of the subsequent stage. In this case, if the subsequent-stage noise is sufficiently larger than a difference between the noise of the load MOS and the noise of the CRCA, the CRCA can be caused to have lower noise. The comparator in the subsequent stage tends to reduce the current as compared to the pixel amplifier in order to decrease power consumption and increase noise as compared to the pixel amplifier, and in most cases, it can be expected to satisfy this condition.

Further, although it seems that the noise increases at high frequencies as indicated by the solid line (CRCA) in the figure, this is because the gain of the amplifier attenuates at high frequencies. Since the input conversion noise is a value obtained by dividing output noise by a gain, it appears to increase extremely in a frequency band in which the gain is small. However, a frequency range in which such a signal is cut is not important in the first place, and thus it is not used for noise estimation.

Figure 13:
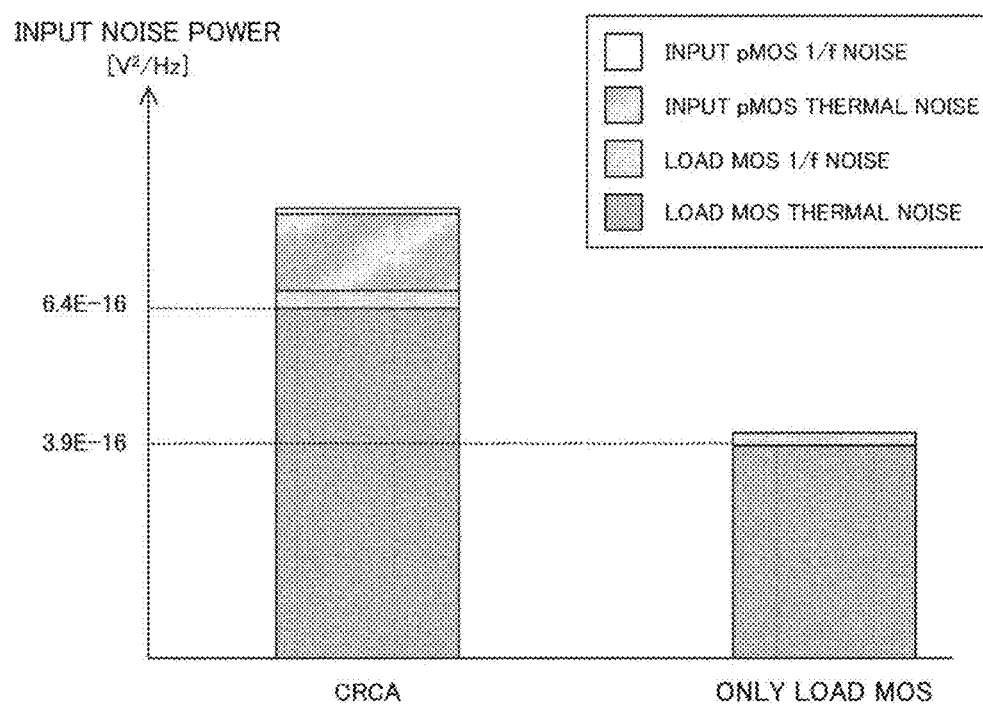
FIG. 13 is a diagram showing an example of noise components in the first embodiment of the present technology and the comparative example.

FIG. 13 shows details of input conversion noise at 500 kHz. Here, the reason why the input conversion noise of the load MOS increases is considered. When the transconductances of the input transistor and the pixel amplifier are $gm_p$ and $gm_x$, the substantial resistance value for converting current noise of the transistor of the pixel amplifier into an input conversion voltage can be expressed by the following formula.

$$(1/gm_p)+(1/gm_x) \qquad \text{Formula 1}$$

When $gm_p$ is 93.5 microsiemens (μS) and $gm_x$ is 25 microsiemens (μS) according to simulation, the first term of Formula 1 is about 40 kiloohms (kΩ) and the second term is 10.75 kiloohms (kΩ). In the case of only the load MOS, the second term is 0 ohm (Ω), and thus the resistance value of the CRCA is about 1.27 times that in the case of only the load MOS. Accordingly, the contribution of noise (power) is 1.61 times. In the figure, thermal noise of the load MOS is 1.67 times, which is almost the same as prediction.

Figure 14:
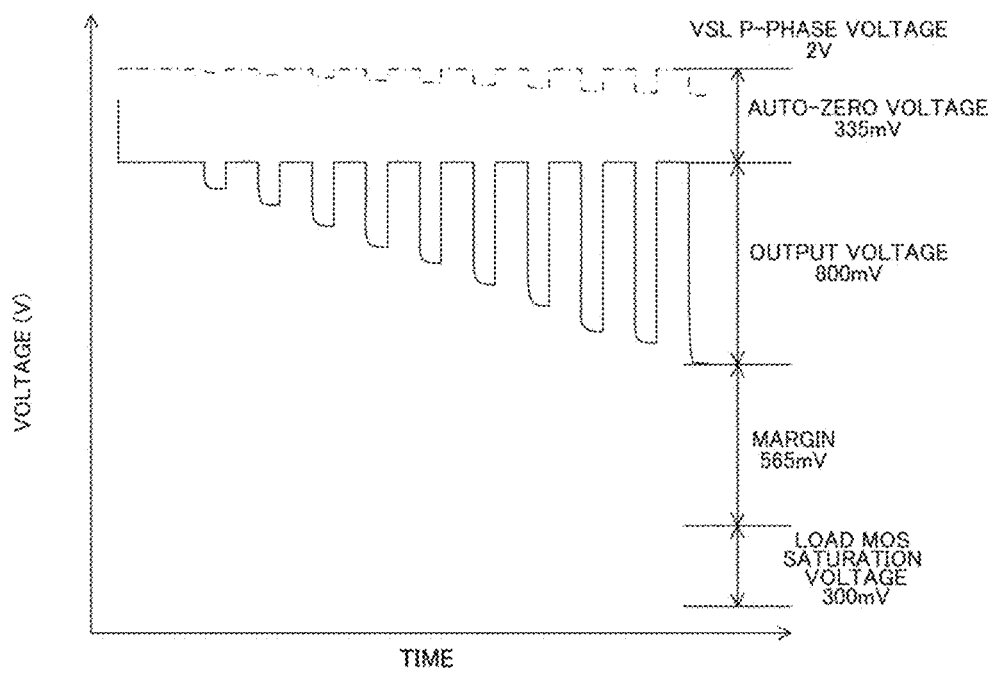
FIG. 14 is a graph showing an example of an input/output voltage waveform in the first embodiment of the present technology.

FIG. 14 is a waveform of an output voltage when an input voltage amplitude is swept in the CRCA. In the figure, the vertical axis represents voltage and the horizontal axis represents time. The alternate long and short dash line indicates the waveform of a voltage of a vertical signal line (that is, input voltage), and the solid line indicates the waveform of the output voltage. One cycle first has an auto-zero period of 1 microsecond (μs), then outputs a P-phase voltage for 2 microseconds (μs), finally outputs a D-phase voltage for 2 microseconds (μs) and ends. Here, the P-phase voltage is a voltage when the floating diffusion layer in the pixel circuit 250 has been initialized, and the D-phase voltage is a voltage when charge has been transferred to the floating diffusion layer.

Further, it is assumed that the input voltage (P-D) is swept in a step of 10 millivolts (mV) in the range of 0 millivolts (mV) to 100 millivolts (mV). Since the gate-drain of the input transistor 322 is short-circuited by the auto-zero signal AZ and the output voltage is set to a zero voltage, the output voltage drops by the gate-source voltage $V_{GS}$ from the voltage of the vertical signal line. Although the LUT transistor is used in the test circuit, the output voltage drops by 335 millivolts (mV), which limits the output range.

Figure 15:
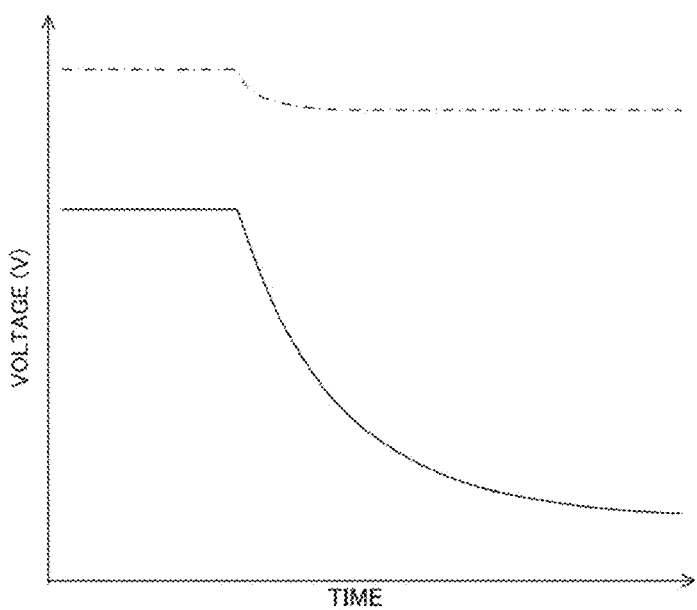
FIG. 15 is a graph showing an example of output voltage settling waveforms in the first embodiment of the present technology and the comparative example.

FIG. 15 shows a state of settling of the output voltage when the voltage (input voltage) of the vertical signal line has been changed by 100 millivolts (mV). In the figure, the vertical axis represents the output voltage of the column amplifier, and the horizontal axis represents the time. The alternate long and short dash line indicates the locus of the output voltage of only the load MOS, and the solid line indicates the locus of the output voltage of the CRCA having a gain of 8 times. When measurement is performed using a time taken to reach 63% of the final voltage as a time constant, a settling time is 100 nanoseconds (ns) in only the load MOS, whereas a settling time greatly increases to 256 nanoseconds (ns) in the CRCA. Since the gain is 8 times in the CRCA, 8 times charge for charging the capacity attached to the output is required. Therefore, the substantial load capacity viewed from the pixel amplifier increases, which deteriorates settling. In the test circuit, the sum of the load capacitance (300 fF) and $C_F//C_S$ (131 fF) is multiplied by 8, and thus it seems that capacitance of 3.45 picofarad (pF) has been added to the vertical signal line. In the case of the load MOS only, the sum of VSL capacitance and load capacitance is 2.3 picofarad (pF). Meanwhile, 8 times the sum of the load capacitance (300 fF) and $C_F//C_S$ (131 fF) is 5.45 picofarad (pF). In this way, in the CRCA, the total capacitance has increased 2.37 times, which is in good agreement with the simulation results.

Figure 16:
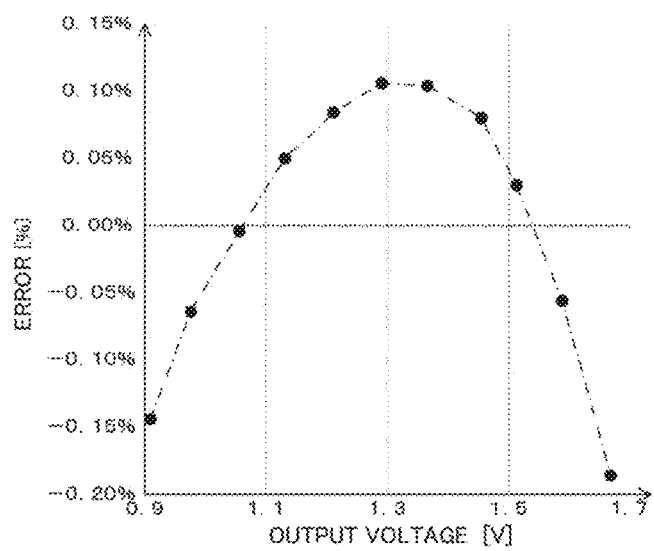
FIG. 16 is a graph showing an example of an error for each output voltage in the first embodiment of the present technology.

FIG. 16 represents an error from a regression line of values after settling of the output voltage when the input voltage has been swept and shows so-called linearity. In the figure, the vertical axis represents the error, and the horizontal axis represents the output voltage. Although the CRCA attempts to curb the error by using negative feedback, a sufficient loop gain cannot be obtained because a feedback rate is low due to voltage division in addition to originally low open gain. As a result, linearity is about 0.3% in width as illustrated in the figure. This is about 6 least significant bits (LSBs) in the case of 11 bits (that is, 2048 grayscale), but it cannot be said to be small. The method for improving this linearity will be described later.

As described above, according to the first embodiment of the present technology, amplification can be performed only by the current of the current source because the input transistor 322 having the source to which the input voltage is input and the feedback circuit 323 that feeds back a part of the current of the current source to the gate of the input transistor 322 are provided. Therefore, it is possible to reduce power consumption as compared to the comparative example in which the input voltage is input to the gate of the input transistor and the current source is added to the source thereof.

2. Second Embodiment

Although negative feedback is formed by the feedback circuit 323 in the first embodiment described above, a sufficient loop gain cannot be obtained because the feedback rate is low, and the linearity may deteriorate in this configuration. The current reuse column amplifier 320 of a second embodiment is different from the first embodiment in that linearity is improved by adding a cascode transistor.

Figure 17:
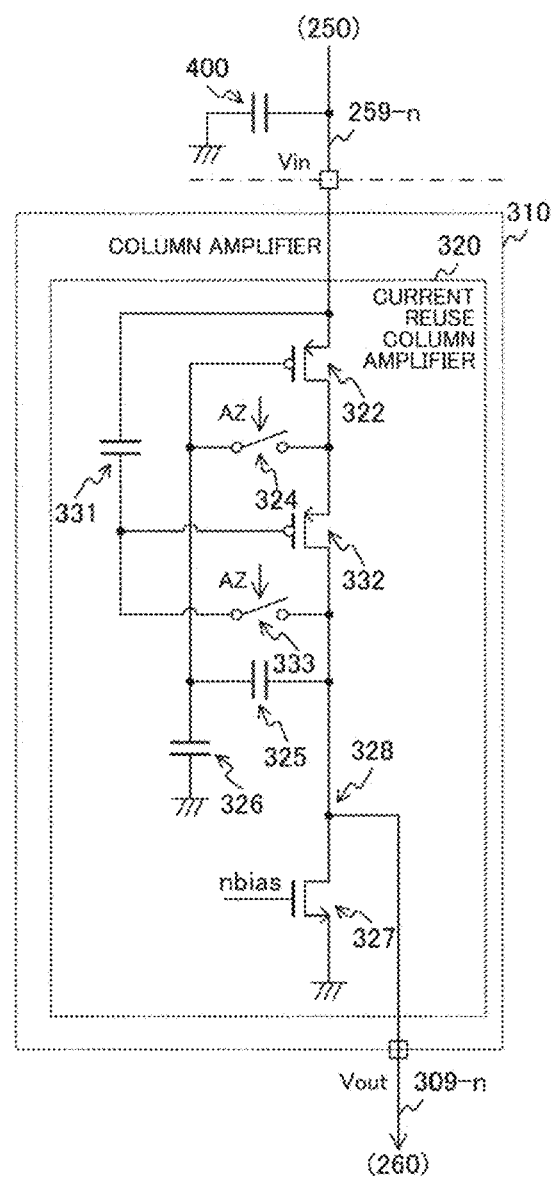
FIG. 17 is a circuit diagram showing a configuration example of a current reuse column amplifier in a second embodiment of the present technology.

FIG. 17 is a circuit diagram showing a configuration example of the current reuse column amplifier 320 in the second embodiment of the present technology. The current reuse column amplifier 320 of the second embodiment is different from the first embodiment in that it further includes a cascode capacitance 331, a cascode transistor 332, and a cascode side auto-zero switch 333. As the cascode transistor 332, for example, a pMOS transistor is used.

The cascode transistor 332 is inserted between the drain of the input transistor 322 and the drain of the reference side current source transistor 327 (load MOS). Further, the cascode capacitance 331 is inserted between the source of the input transistor 322 (that is, the vertical signal line 259-$n$) and the gate of the cascode transistor 332.

The cascode side auto-zero switch 333 opens and closes the path between the gate and the drain of the cascode transistor 332 according to the auto-zero signal AZ.

Although the gate voltage of the cascode transistor is biased at a constant voltage in an normal analog circuit, the source voltage (that is, the input voltage) of the input transistor 322 fluctuates in the CRCA and thus it is necessary to bias at a voltage following the source voltage. Therefore, as illustrated in the figure, the cascode capacitance 331 is connected between the vertical signal line 259-$n$ and the gate of the cascode transistor 332, and the cascode side auto-zero switch 333 is closed at the time of auto zero. Accordingly, the gate voltage of the cascode transistor can be linked to the vertical signal line 259-$n$. The current reuse column amplifier 320 illustrated in the figure is hereinafter referred to as "cascode (C)-CRCA".

Figure 18:
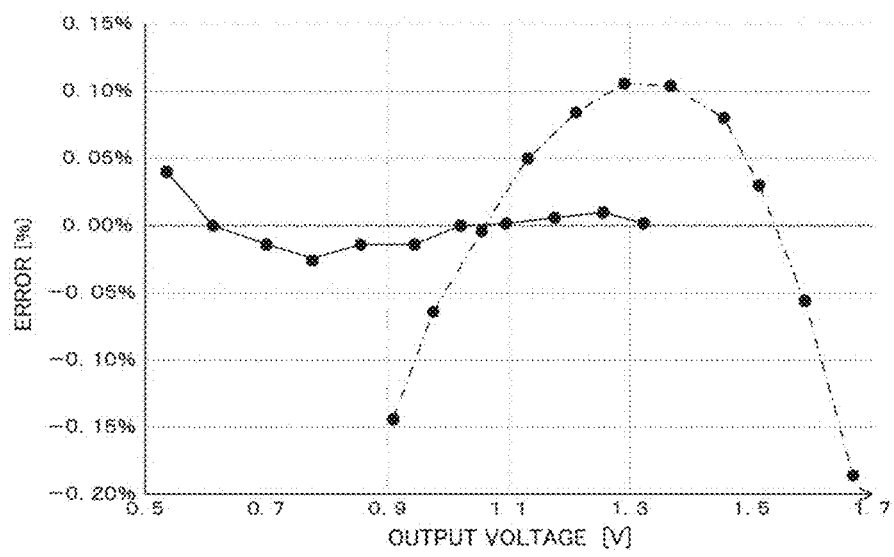
FIG. 18 is a graph showing an example of errors for each output voltage in the first and second embodiments of the present technology.

FIG. 18 is a graph showing an example of error for each output voltage in the first and second embodiments of the present technology. In the figure, the vertical axis represents the error, and the horizontal axis represents the output voltage. Further, the alternate long and short dash line in the figure indicates linearity of the CRCA of the first embodiment without the cascode transistor 332 and the like, and the solid line indicates linearity of the C-CRCA of the second embodiment. As illustrated in the figure, the linearity is greatly improved according to addition of the cascode transistor 332 and thus has a width of 0.06% in the second embodiment.

As described above, according to the second embodiment of the present technology, the linearity of the output voltage with respect to the input voltage can be improved because the cascode transistor 332 in which the voltage depending on the input voltage is applied to the gate is inserted.

3. Third Embodiment

In the second embodiment described above, the cascode transistor 332 is inserted between the drain of the input transistor 322 and the reference side current source transistor 327 (load MOS). However, in this C-CRCA, the output range decreases and thus becomes a problem. The current reuse column amplifier 320 of a third embodiment is different from the second embodiment in that the output range is extended by a folded stage.

Figure 19:
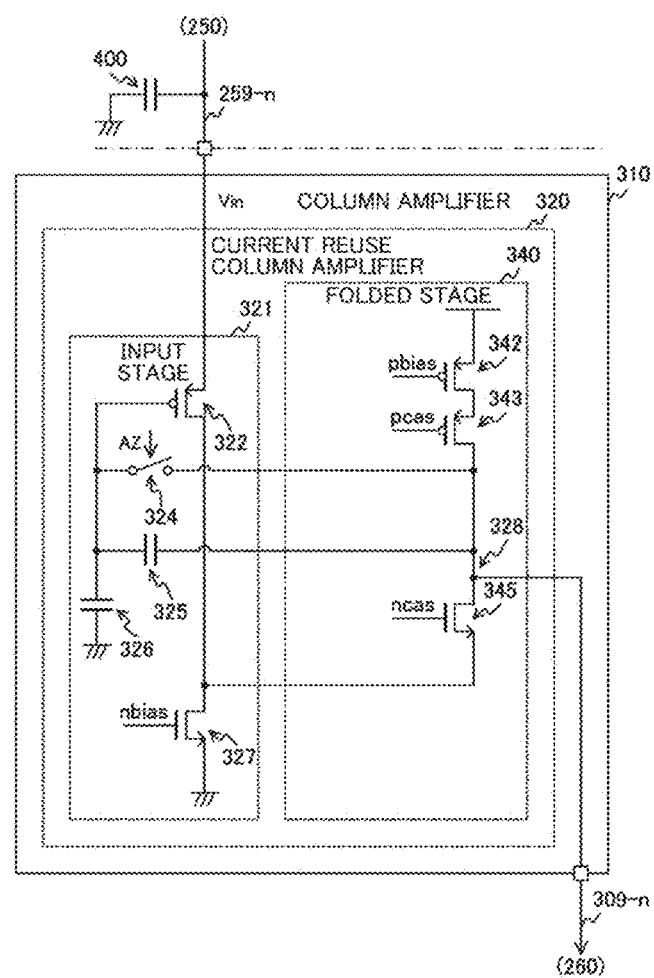
FIG. 19 is a circuit diagram showing a configuration example of a current reuse column amplifier in a third embodiment of the present technology.

FIG. 19 is a circuit diagram showing a configuration example of the current reuse column amplifier 320 in the third embodiment of the present technology. The current reuse column amplifier 320 of the third embodiment includes an input stage 321 and a folded stage 340. The input transistor 322, the input side auto-zero switch 324, the feedback capacitance 325, the reference side capacitance 326, and the reference side current source transistor 327 are disposed in the input stage 321. The connection configuration of the input transistor 322, the reference side capacitance 326, and the reference side current source transistor 327 is the same as that of the first embodiment.

Further, a power supply side current source transistor 342 and cascode transistors 343 and 345 are disposed in the folded stage. A pMOS transistor is used as the power supply side current source transistor 342 and the cascode transistor 343, and an nMOS transistor is used as the cascode transistor 345.

The power supply side current source transistor 342 and the cascode transistor 343 are connected in series to a power supply node. Further, a bias voltage pbias is applied to the gate of the power supply side current source transistor 342, and a bias voltage pcas is applied to the gate of the cascode transistor 343. The power supply side current source transistor 342 is an example of a power supply side current source described in the claims.

The cascode transistor 345 is inserted between the cascode transistor 343 and the reference side current source transistor 327. Further, a predetermined bias voltage ncas is applied to the gate of the cascode transistor 345.

Further, the node between the cascode transistors 343 and 345 is used as the output node 328. The input side auto-zero switch 324 opens and closes the path between the input transistor 322 and the output node 328, and the feedback capacitance 325 is inserted between the input transistor 322 and the output node 328.

The current reuse column amplifier 320 illustrated in the figure is hereinafter referred to as "folded cascode (FC)-CRCA". Although the current flowing through the folded stage 340 is added in this FC-CRCA, this current can be reduced as compared to the current of the input stage 321. Since the input conversion noise of the power supply side current source transistor 342 is also smaller when the current is reduced, it is desirable to reduce the current. In the FC-CRCA of the third embodiment, the output range can be extended by 1 $V_{GS}$ as compared to the C-CRCA of the second embodiment.

As described above, according to the third embodiment of the present technology, the output range can be extended as compared to the second embodiment having the cascode transistor 332 alone because the cascode transistors 343 and 345 are added.

Modified Example

Although the cascode transistors 343 and 345 are added in the third embodiment described above, the output range may be insufficient in this configuration. The current reuse column amplifier 320 of this modified example of the third embodiment is different from the first embodiment in that the reference voltage is applied to the feedback capacitance 325 to extend the output range at the time of auto zero.

Figure 20:
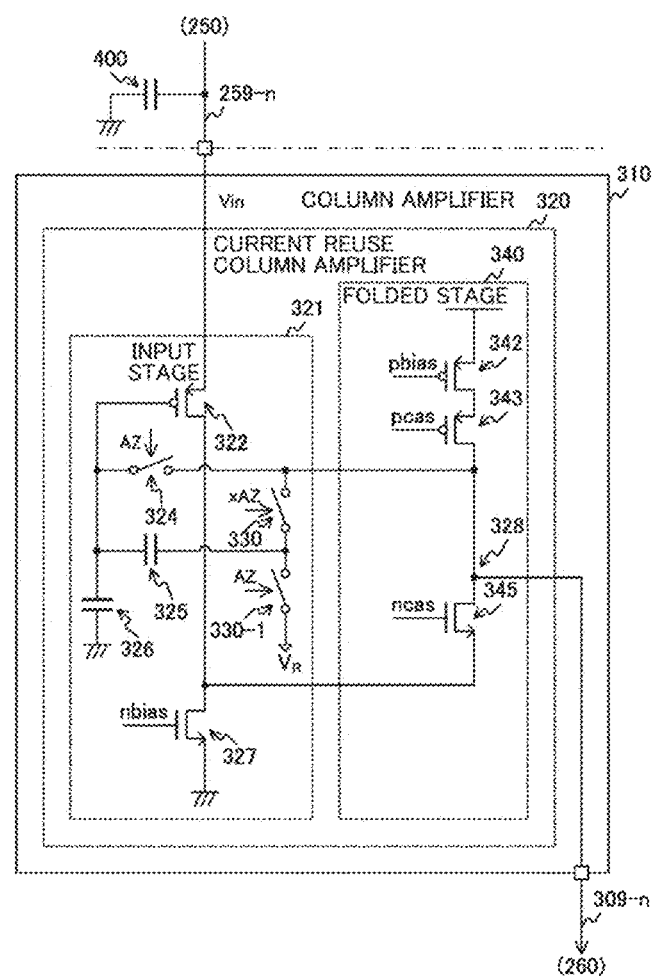
FIG. 20 is a circuit diagram showing a configuration example of a current reuse column amplifier in a modified example of the third embodiment of the present technology.

FIG. 20 is a circuit diagram showing a configuration example of the current reuse column amplifier 320 in the modified example of the third embodiment of the present technology. The current reuse column amplifier 320 of the modified example of the third embodiment is different from the third embodiment in that it further includes an intermediate switch 330 and a reference switch 330-1. Further, one end of the feedback capacitance 325 is connected to the node between the intermediate switch 330 and the reference switch 330-1 instead of the output node 328.

The intermediate switch 330 opens and closes the path between the output node 328 and one end of the feedback capacitance 325 according to an inverted signal xAZ. Here, the inverted signal xAZ is a signal obtained by inverting the auto-zero signal AZ. The reference switch 330-1 opens and closes the path between one end of the feedback capacitance 325 and a node of a predetermined reference voltage $V_R$ according to the auto-zero signal AZ.

According to the configuration illustrated in the figure, the timing control circuit 230 closes the input side auto-zero switch 324 and the reference switch 330-1 and opens the intermediate switch 330 at the time of auto zero. Accordingly, it is possible to determine the zero voltage, which is the output voltage at the time of auto zero, regardless of the vertical signal line. The reference voltage $V_R$ is set to such a high voltage that the power supply side current source transistor 342 and the cascode transistor 343 do not enter a linear region. Accordingly, it is possible to make the best use of the output range.

As described above, according to the modified example of the third embodiment of the present technology, the output range can be extended by setting the zero voltage to a voltage depending on the reference voltage $V_R$ because the reference switch 330-1 for connecting the node of the reference voltage $V_R$ is added to one end of the feedback capacitance 325 at the time of auto zero.

4. Fourth Embodiment

Although the input side auto-zero switch 324 opens and closes the path between the input transistor 322 and the output node 328 in the third embodiment described above, the zero voltage of the output drops 1 $V_{GS}$ from that of the vertical signal line at the time of auto zero in this configuration. The current reuse column amplifier 320 of a fourth embodiment is different from the third embodiment in that auto zero is individually performed in the input stage 321 and the folded stage 340 and a switch is inserted therebetween to curb decrease in the zero voltage.

Figure 21:
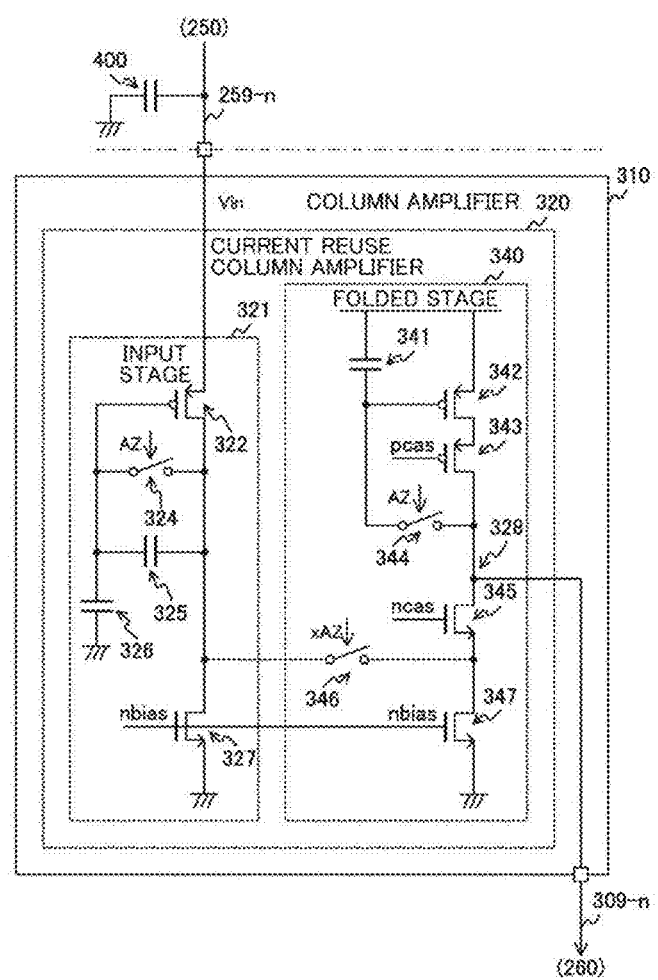
FIG. 21 is a circuit diagram showing a configuration example of a current reuse column amplifier in a fourth embodiment of the present technology.

FIG. 21 is a circuit diagram showing a configuration example of the current reuse column amplifier 320 in the fourth embodiment of the present technology. The current reuse column amplifier 320 of the fourth embodiment is different from the third embodiment in that it further includes a cascode capacitance 341, an output side auto-zero switch 344, an intermediate switch 346, and a reference side current source transistor 347. An nMOS transistor is used as the reference side current source transistor 347. Further, the connection configuration of the elements in the input stage 321 of the fourth embodiment is the same as that of the first embodiment.

Further, the cascode capacitance 341 is inserted between the power supply node having a predetermined power supply voltage and the output side auto-zero switch 344. The gate of the power supply side current source transistor 342 is connected to the node between the cascode capacitance 341 and the output side auto-zero switch 344.

Further, the reference side current source transistor 347 is inserted between the cascode transistor 345 and the reference node. The same bias voltage nbias as that of the reference side current source transistor 327 is applied to the gate of the reference side current source transistor 347. The reference side current source transistor 327 is an example of a first reference side current source transistor described in the claims, and the reference side current source transistor 347 is an example of a second reference side current source transistor described in the claims.

The intermediate switch 346 opens and closes the path between the node between the input transistor 322 and the reference side current source transistor 327 and the node between the cascode transistor 345 and the reference side current source transistor 347 according to the inverted signal xAZ.

Further, the output side auto-zero switch 344 opens and closes the path between the cascode capacitance 341 and the output node 328 according to the auto-zero signal AZ.

The current reuse column amplifier 320 illustrated in the figure is hereinafter referred to as a "modified folded cascode (MFC)-CRCA".

According to the configuration illustrated in the figure, the input stage 321 and the folded stage 340 can be separated by the intermediate switch 346 at the time of auto zero, and auto zero can be separately performed therein. In the input stage 321, the input side auto-zero switch 324 performs auto zero using an intermediate node. On the other hand, the output side auto-zero switch 344 in the folded stage 340 short-circuits the gate of the power supply side current source transistor 342 and the output node 328. In this manner, the zero voltage of the output becomes a voltage dropped by 1 $V_{GS}$ from the power supply of the folded stage 340, and thus a voltage higher than that of the FC-CRCA of the third embodiment can be set to a zero voltage. Accordingly, the output range increases. Since the single current source in the third embodiment is divided into two (the reference side current source transistors 327 and 347) in the fourth embodiment, the effect of auto zero is diminished and thus it is necessary to be aware of generation of an offset. In particular, the drain voltage of the input transistor 322 decreases during a normal operation as compared to that during auto zero and thus is offset in the direction in which the output voltage increases. This offset increases particularly when the current of the folded stage 340 is reduced as compared to that of the input stage 321.

Further, although the output range is greatly extended, the maximum value of the input range decreases by the saturation voltage of the input transistor 322 as compared to the case where only the load MOS is provided. When used with 1× gain, the input range is narrower and noise increases as compared to the case where only the load MOS is provided. Accordingly, there is a risk that the noise suppression effect in the subsequent stage will be lost.

Figure 22:
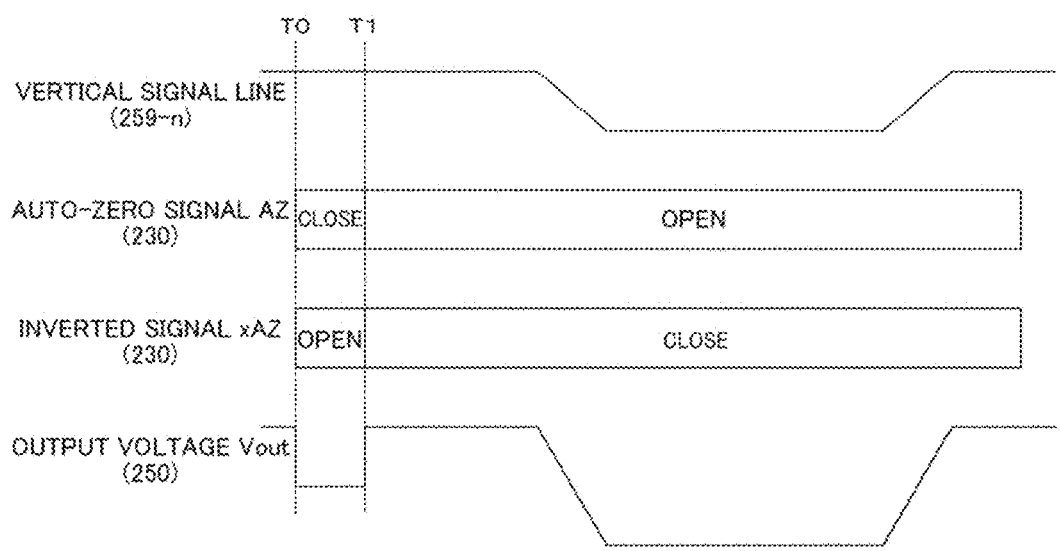
FIG. 22 is a timing chart showing an example of an operation of a column amplifier in the fourth embodiment of the present technology.

FIG. 22 is a timing chart showing an example of the operation of the column amplifier 310 in the fourth embodiment of the present technology. At a timing T0 at which the voltage of the vertical signal line 259-n is initialized, the timing control circuit 230 controls the input side auto-zero switch 324 and the output side auto-zero switch 344 such that they switch to a closed state according to the auto-zero signal AZ. Further, the timing control circuit 230 controls the intermediate switch 346 such that it switches to an open state according to the inverted signal xAZ.

Then, at a timing Ti after a predetermined pulse period has elapsed, the timing control circuit 230 controls the input side auto-zero switch 324 and the output side auto-zero switch 344 such that they switch to an open state according to the auto-zero signal AZ. Further, the timing control circuit 230 controls the intermediate switch 346 such that it switches to a closed state according to the inverted signal xAZ.

When the voltage of the floating diffusion layer generated by photoelectric conversion lowers the gate voltage of the amplification transistor 255, the amount of current supplied to the vertical signal line 259-n decreases and the voltage (input voltage Vin) of the vertical signal line 259-n also decreases. Due to the decrease in the input voltage Vin, the gate-source voltage $V_{GS}$ of the input transistor 322 decreases, and the current is further reduced. Here, since the reference side current source transistors 327 and 347 continue to draw a constant current, the amount of decrease in the current from the vertical signal line 259-n is drawn from the output side. The output node 328 has a high impedance due to the cascode transistors 343 and 345, which causes a large voltage drop. Further, change in the output voltage Vout is negatively fed back to the input transistor 322 through the feedback capacitance 325 and the reference side capacitance 326.

As described above, according to the fourth embodiment of the present technology, since the intermediate switch 346 separates the input stage 321 and the folded stage 340 at the time of auto-zero, and thus auto zero is individually performed, it is possible to increase the zero voltage to widen the output range as compared to the case where the input stage 321 and the folded stage 340 are not separated.

5. Fifth Embodiment

In the first embodiment described above, the substantial load capacitance viewed from the pixel amplifier increases and settling deteriorates because the gain is higher than that in the case of the load MOS alone. The column amplifier 310 of this fifth embodiment is different from the first embodiment in that a boost circuit 350 is added to reduce the load capacitance.

Figure 23:
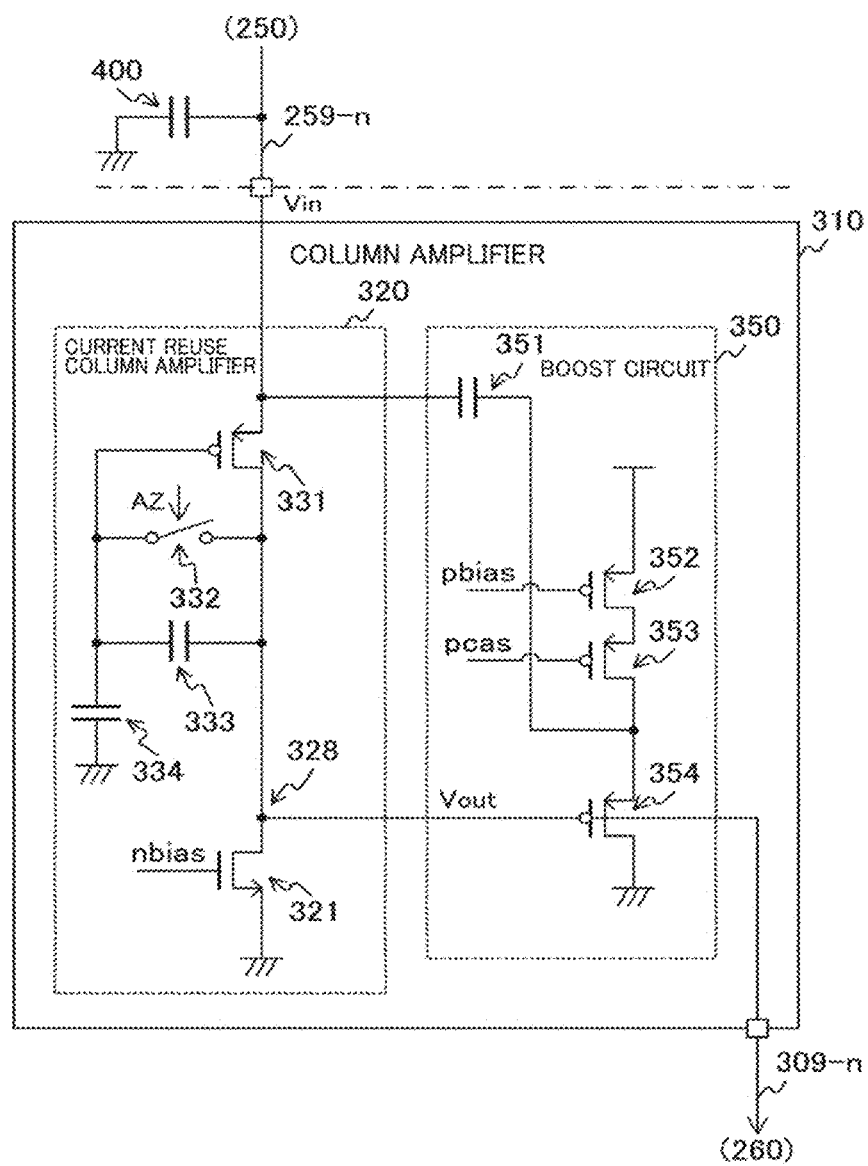
FIG. 23 is a circuit diagram showing a configuration example of a column amplifier in a fifth embodiment of the present technology.

FIG. 23 is a circuit diagram showing a configuration example of the column amplifier 310 in the fifth embodiment of the present technology. The column amplifier 310 of the fifth embodiment is different from the first embodiment in that it further includes the boost circuit 350 in addition to the current reuse column amplifier 320. A boost side capacitance 351, a boost side current source transistor 352, a cascode transistor 353, and a boost transistor 354 are disposed in the boost circuit 350. A pMOS transistor is used as the boost side current source transistor 352, the cascode transistor 353, and the boost transistor 354.

The boost side current source transistor 352, the cascode transistor 353, and the boost transistor 354 are inserted in series between the power supply node and the reference node. A predetermined bias voltage pbias is applied to the gate of the boost side current source transistor 352, and a predetermined bias voltage pcas is applied to the gate of the cascode transistor 353. The gate of the boost transistor 354 is connected to the output node 328. The boost side current source transistor 352 and the cascode transistor 353 are an example of a boost side current source described in the claims.

Further, the boost side capacitance 351 is inserted between the vertical signal line 259-*n* and the node between the cascode transistor 353 and the boost transistor 354.

According to the configuration shown in the figure, the output voltage Vout can be buffered by using a source follower of the boost transistor 354 and can be coupled to the vertical signal line 259-*n* by capacitance. For example, when the gain is 8 times, the amount of voltage drop of the output voltage Vout is 8 times the voltage drop in the vertical signal line 259-*n*, and thus voltage fluctuation of 7 times the difference therebetween occurs in the boost side capacitance 351. Then, the current for charging the boost side capacitance 351 can be drawn from the vertical signal line 259-*n* to assist settling. This operation can be regarded as an operation in which negative capacitance to the ground, which is 7 times as large as that of the vertical signal line 259-*n*, is attached to the vertical signal line 259-*n* and has the effect of effectively reducing the load capacitance.

Here, the load capacity on the output side is represented by the following formula.

$$C_L + C_S // C_F \quad \text{Formula 2}$$

When the capacitance value of the boost side capacitance 351 is set to the same level as in Formula 2, it can be expected that virtual capacitance that increases according to the gain is completely canceled. However, when the gain is 1, it should be noted that the voltage of the boost side capacitance 351 does not change and does not operate at all.

Although an additional branch current for the boost circuit 350 is required in the fifth embodiment, this current may be relatively small. When there is a gain, a large current can flow to the reference node according to application of the gate-source voltage $V_{GS}$ of the boost transistor 354. Further, noise of the additional boost circuit 350 does not appear in the output because it is filtered by the VSL capacitance 400.

Figure 24:
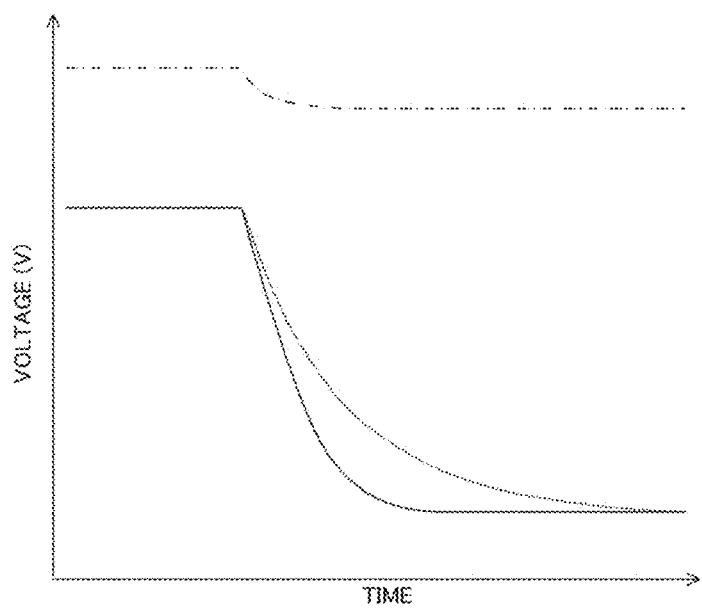
FIG. 24 is a graph showing an example of an input/output voltage waveform in the fifth embodiment of the present technology.

FIG. 24 is a graph showing an example of input/output voltage waveforms in the fifth embodiment of the present technology. In the figure, the vertical axis represents voltage and the horizontal axis represents time. The alternate long and short dash line indicates the waveform of the input voltage, and the solid line indicates the waveform of the output voltage when the boost circuit 350 is added. The dotted line indicates the waveform of the output voltage when the boost circuit 350 is not added.

It is assumed that the size of the boost transistor 354 is 8 u/1 u, the current is 1 microampere (μA), and the capacitance value of the boost side capacitance 351 is 431 femtofarads (fF). In this case, the waveforms shown in the figure are obtained. The time constant, which is 256 nanoseconds (ns) when there is the CRCA alone, is improved to 167 nanoseconds (ns) according to addition of the boost circuit 350.

Figure 25:
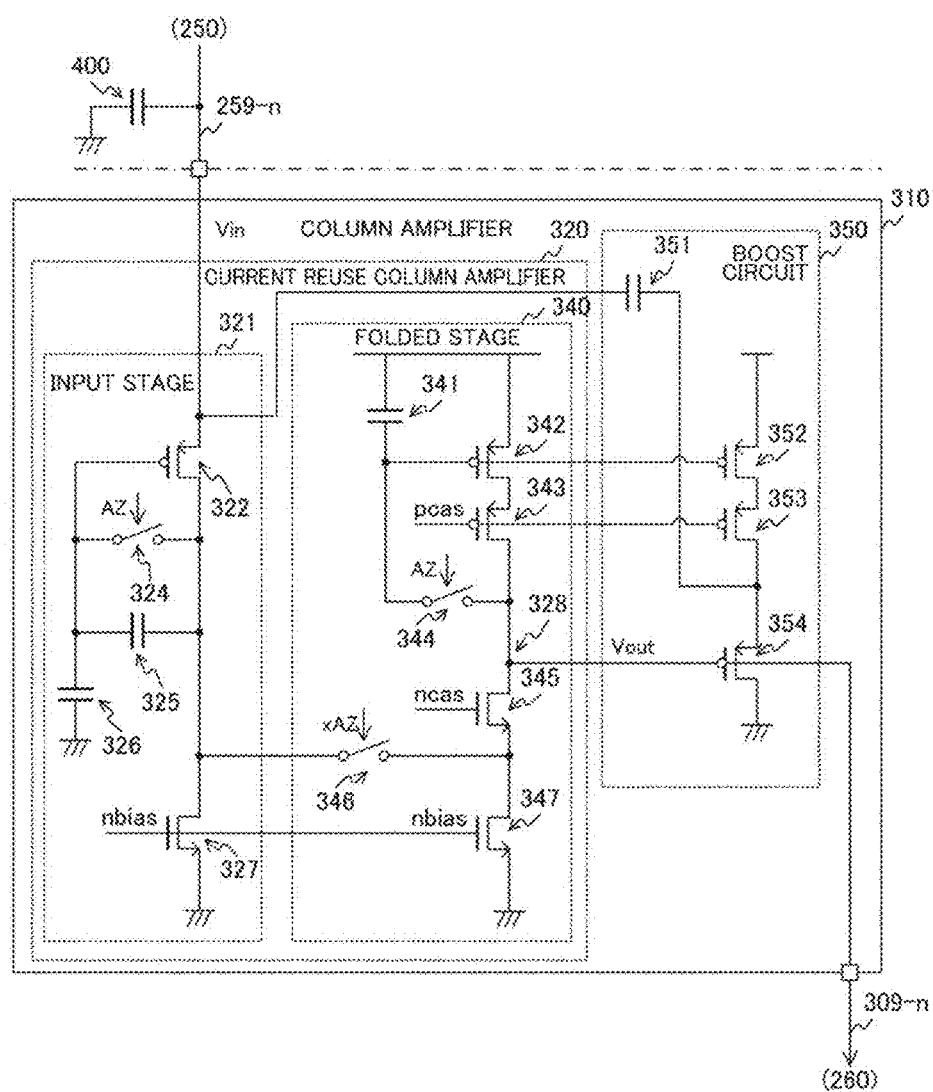
FIG. 25 is a circuit diagram showing another example of the column amplifier in the fifth embodiment of the present technology.

Although the boost circuit 350 is added to the CRCA of the first embodiment, the boost circuit 350 can also be added to the second to fourth embodiments. For example, as illustrated in FIG. 25, the boost circuit 350 can be added to the MFC-CRCA of the fourth embodiment.

As described above, according to the fifth embodiment of the present technology, the time required for settling can be shortened because the load capacity is reduced by adding the boost circuit 350.

Figure 26:
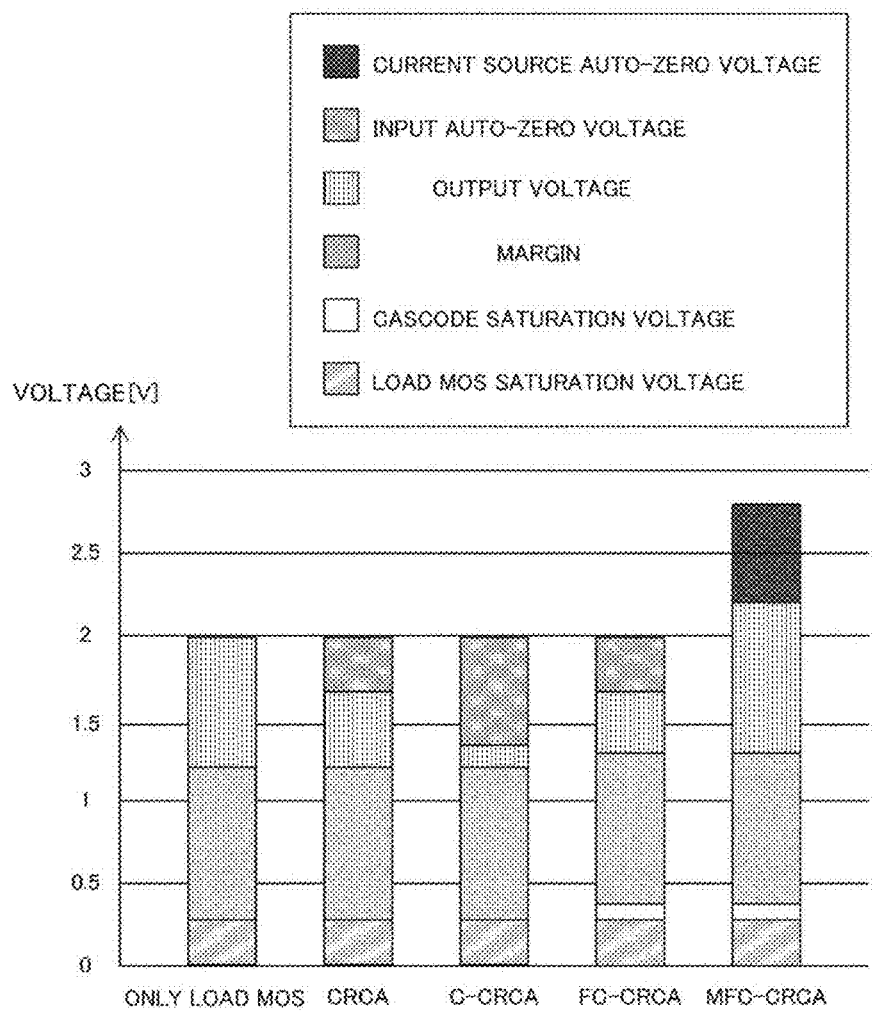
FIG. 26 is a diagram showing an example of output ranges in the comparative example and the first to fifth embodiments of the present technology.
Figure 27:
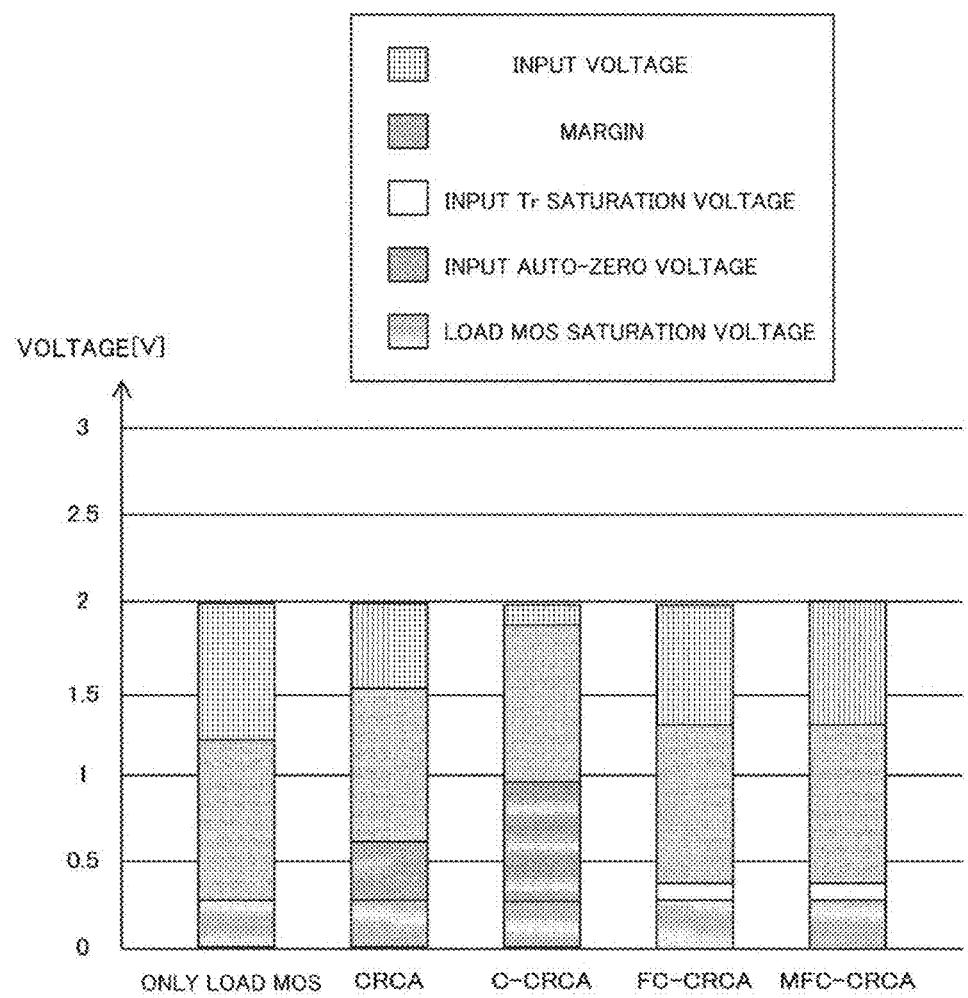
FIG. 27 is a diagram showing an example of input ranges in the comparative example and the first to fifth embodiments of the present technology.

Subsequently, a comparative example in which only the load MOS is provided and the first to fifth embodiments will be compared. FIG. 26 shows an example of output ranges in the comparative example in which only the load MOS is provided and the first to fifth embodiments. FIG. 27 shows an example of input ranges in the comparative example in which only the load MOS is provided and the first to fifth embodiments.

The zero voltage of an input signal is set to 2 volts (V), a voltage range that can be decreased from the zero voltage is set as an input range, and a voltage range that can be output at any gain is set as an output range. First, in the case of only the load MOS in the comparative example, only 300 millivolts (mV) is required for the reference side current source to saturate in the circuit. However, when 900 millivolts (mV) is secured as a margin for absorbing variation and IR drop, the remaining 800 millivolts (mV) obtained by subtracting these from 2 volts (V) becomes the net output range.

Next, in the CRCA of the first embodiment, a voltage drop of 335 millivolts (mV) occurs due to the auto-zero operation of the input transistor 322, and thus the output range is reduced by that amount. Further, in the C-CRCA of the second embodiment, the voltage drop of auto zero is doubled, and thus the output range is only 130 millivolts (mV). Meanwhile, the input and output ranges are identical in the comparative example in which only the load MOS is provided, the CRCA and the C-CRCA.

Although the voltage drop of auto zero is only one step in the FC-CRCA of the third embodiment, it is necessary to secure a saturation voltage of about 100 millivolts (mV) because the nMOS cascode transistor 345 is added.

In the MFC-CRCA of the fourth embodiment, subtraction can be started from the power supply voltage (here, 2.8 volts) instead of the input signal of 2 volts (V) due to the difference in the auto-zero method. The voltage drop at the time of auto zero is 600 millivolts (mV). Further, even if 100 millivolts (mV), which is the saturation voltage of the nMOS cascode transistor 345, is subtracted, the output range is 900 millivolts (mV), which is higher than that in any other method. Regarding the input range, the voltage drop due to auto zero disappears, but only 100 millivolts (mV), which is the saturation voltage of the input transistor 322, is required, and thus the input range is 700 millivolts (mV) and is slightly smaller than that in the case in which only the load MOS is provided.

Subsequently, FIG. 28 shows prediction of input conversion noise and a signal-noise ratio (SNR) when noise of comparators in the subsequent stage is taken into consideration. A comparator A is a type of comparator that operates at a lower voltage than a comparator B. The comparator A has lower power consumption than the comparator B but has large noise.

When the CRCA is employed for a comparator with large noise such as the comparator A, a great effect is obtained. Therefore, noise was predicted when the CRCA of the first embodiment and the MFC-CRCA of the fourth embodiment were combined with A. When the comparator A is combined with the CRCA, input conversion noise is suppressed to about ⅓ of that of the comparator A at a gain of 8 times. However, the input/output range is reduced, and thus the SNR is not so good. When the gain is 1 time, the SNR deteriorates significantly.

When the comparator A is combined with the MFC-CRCA, the input/output range is not reduced. Therefore, the SNR is improved by 3 decibels (dB) or more when the gain is 8 times, and the SNR is not deteriorated when the gain is 1 time. In comparison to the comparator B, the SNR is the same when the gain is 8 times and is not comparable when the gain is 1 time. Although there is a difference of several times in power consumption between the comparators A and B, noise performance equivalent to that of the comparator B can be obtained with a small amount of power if the MFC-CRCA is adopted for the comparator A when the gain is 8 times.

6. Example of Application to Moving Body

The technology according to the present disclosure (the present technology) can be applied to various products. For example, the technology according to the present disclosure may be realized as a device mounted on any type of moving body such as an automobile, an electric vehicle, a hybrid electric vehicle, a motorcycle, a bicycle, a personal mobility device, an airplane, a drone, a ship, and a robot.

Figure 29:
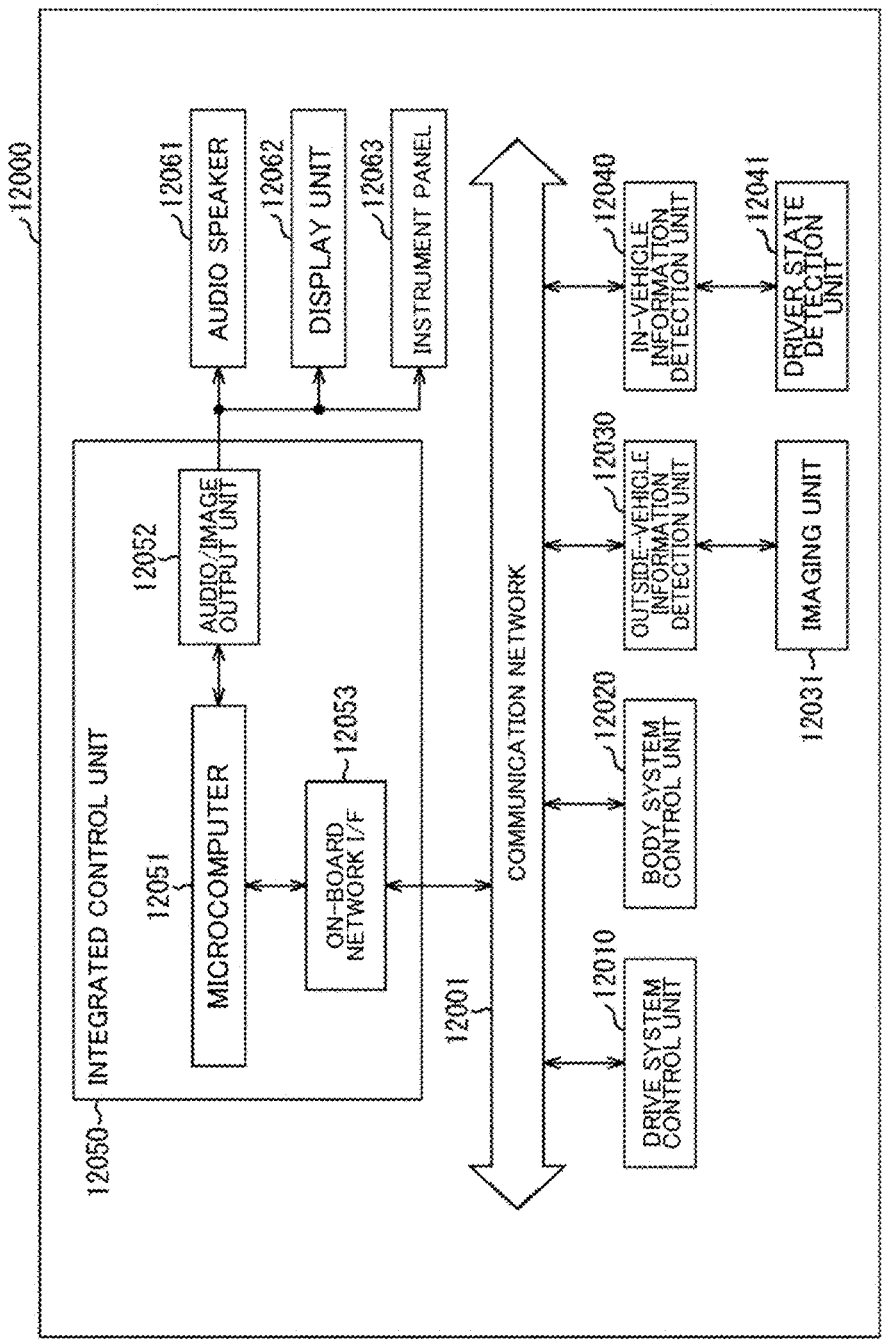
FIG. 29 is a block diagram showing a schematic configuration example of a vehicle control system.

FIG. 29 is a block diagram showing a schematic configuration example of a vehicle control system, which is an example of a moving body control system to which the technology according to the present disclosure can be applied.

The vehicle control system 12000 includes a plurality of electronic control units connected via a communication network 12001. In the example shown in FIG. 29, the vehicle control system 12000 includes a drive system control unit 12010, a body system control unit 12020, an outside-vehicle information detection unit 12030, an in-vehicle information detection unit 12040, and an integrated control unit 12050. Further, as a functional configuration of the integrated control unit 12050, a microcomputer 12051, an audio/image output unit 12052, and an onboard network interface (I/F) 12053 are illustrated.

The drive system control unit 12010 controls operations of devices related to a drive system of a vehicle according to various programs. For example, the drive system control unit 12010 serves as a driving force generation device for generating a driving force of a vehicle such as an internal combustion engine or a driving motor, a driving force transmission mechanism for transmitting a driving force to wheels, a steering mechanism for adjusting a turning angle of a vehicle, and a control device such as a braking device that generates a braking force of a vehicle.

The body system control unit 12020 controls operations of various devices mounted in the vehicle body according to various programs. For example, the body system control unit 12020 serves as a control device of a keyless entry system, a smart key system, a power window device, or various lamps such as a head lamp, a back lamp, a brake lamp, a turn signal, and a fog lamp. In this case, radio waves transmitted from a portable device that substitutes for a key or signals of various switches can be input to the body system control unit 12020. The body system control unit 12020 receives inputs of these radio waves or signals and controls a door lock device, a power window device, a lamp, and the like of the vehicle.

The outside-vehicle information detection unit 12030 detects information outside the vehicle in which the vehicle control system 12000 is mounted. For example, an imaging unit 12031 is connected to the outside-vehicle information detection unit 12030. The outside-vehicle information detection unit 12030 causes the imaging unit 12031 to capture an image of the outside of the vehicle and receives the captured image. The outside-vehicle information detection unit 12030 may perform object detection processing or distance detection processing for people, cars, obstacles, signs, and letters on a road on the basis of the received image.

The imaging unit 12031 is an optical sensor that receives light and outputs an electrical signal according to the intensity of the light received. The imaging unit 12031 can output an electrical signal as an image or output it as distance measurement information. In addition, the light received by the imaging unit 12031 may be visible light or invisible light such as infrared rays.

The in-vehicle information detection unit 12040 detects information on the inside of the vehicle. For example, a driver state detection unit 12041 that detects a state of a driver is connected to the in-vehicle information detection unit 12040. The driver state detection unit 12041 includes, for example, a camera that captures an image of a driver, and the in-vehicle information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generator, the steering mechanism, or the braking device on the basis of information on the inside or outside the vehicle acquired by the outside-vehicle information detection unit 12030 or the in-vehicle information detection unit 12040, and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, or the like.

Further, the microcomputer 12051 can perform cooperative control for the purpose of automated driving or the like in which autonomous travel is performed without depending on operations of the driver by controlling the driving force generator, the steering mechanism, the braking device, and the like on the basis of information regarding the surroundings of the vehicle acquired by the outside-vehicle information detection unit 12030 or the in-vehicle information detection unit 12040.

In addition, the microcomputer 12051 can output a control command to the body system control unit 12020 on the basis of the information on the outside of the vehicle acquired by the outside-vehicle information detection unit 12030. For example, the microcomputer 12051 can perform cooperative control for antiglare such as switching a high beam to a low beam by controlling a headlamp according to a position of a preceding vehicle or an oncoming vehicle detected by the outside-vehicle information detection unit 12030.

The audio/image output unit 12052 transmits an output signal of at least one of audio and an image to an output device that can visually or audibly notify an occupant of the vehicle or the outside of information. In the example of FIG. 29, as such an output device, an audio speaker 12061, a display unit 12062, and an instrument panel 12063 are illustrated. The display unit 12062 may include, for example, at least one of an onboard display and a heads-up display.

Figure 30:
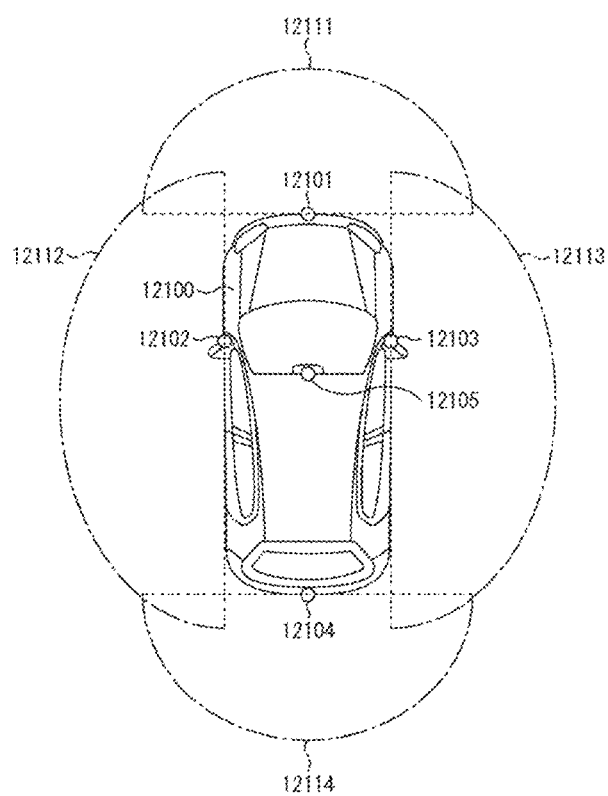
FIG. 30 is an explanatory diagram showing an example of installation positions of imaging units.

FIG. 30 is a diagram showing an example of an installation position of the imaging unit 12031.

In FIG. 30, imaging units 12101, 12102, 12103, 12104, and 12105 are provided as the imaging unit 12031.

The imaging units 12101, 12102, 12103, 12104, and 12105 may be provided at positions such as a front nose, side-view mirrors, a rear bumper, a back door, and an upper part of a windshield in the vehicle interior of the vehicle 12100, for example. The imaging unit 12101 provided at the front nose and the imaging unit 12105 provided at the upper part of the windshield in the vehicle interior mainly acquires front view images of the vehicle 12100. The imaging units 12102 and 12103 provided on the side-view mirrors mainly acquire images of the lateral side of the vehicle 12100. The imaging unit 12104 provided on the rear bumper or the back door mainly acquires images in the rear of the vehicle 12100. The imaging unit 12105 provided at the upper part of the windshield in the vehicle interior is used to mainly detect preceding vehicles, pedestrians, obstacles, traffic signals, traffic signs, lanes, or the like.

Here, FIG. 30 illustrates an example of imaging ranges of the imaging units 12101 to 12104. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, a bird's-eye view image of the vehicle 12100 as viewed from above can be obtained by superimposition of image data captured by the imaging units 12101 to 12104.

At least one of the imaging units 12101 to 12104 may have a function for obtaining distance information. For example, at least one of the imaging units 12101 to 12104 may be a stereo camera composed of a plurality of imaging elements or may be an imaging element having pixels for phase difference detection.

For example, the microcomputer 12051 can extract, as a preceding vehicle, particularly a three-dimensional object that is the closest three-dimensional object on a traveling path of the vehicle 12100 and travels at a predetermined speed (for example, 0 km/h or more) in almost the same direction as the vehicle 12100 by obtaining a distance to each three-dimensional object in the imaging ranges 12111 to 12114 and a change in the distance over time (a relative speed with respect to the vehicle 12100) on the basis of distance information obtained from the imaging units 12101 to 12104. In addition, the microcomputer 12051 can set an inter-vehicle distance to be secured in advance in front of the preceding vehicle, and perform automatic brake control (including following stop control), automatic acceleration control (including following start control), and the like. In this manner, it is possible to perform cooperative control for automated driving or the like in which autonomous travel is performed without the operation of the driver.

For example, the microcomputer 12051 can classify three-dimensional object data regarding three-dimensional objects into two-wheeled vehicles, ordinary vehicles, large vehicles, pedestrians, and other three-dimensional objects such as utility poles and extract the three-dimensional object data on the basis of distance information obtained from the imaging units 12101 to 12104 and use the three-dimensional object data for automatic avoidance of obstacles. For example, the microcomputer 12051 identifies obstacles in the vicinity of the vehicle 12100 as obstacles that can be visually recognized by the driver of the vehicle 12100 and obstacles that are difficult to visually recognize. Then, the microcomputer 12051 can determine a risk of collision indicating the degree of risk of collision with each obstacle, and can perform driving assistance for collision avoidance by outputting a warning to a driver through the audio speaker 12061 or the display unit 12062 and performing forced deceleration or avoidance steering through the drive system control unit 12010 when the risk of collision has a value equal to or greater than a set value and there is a possibility of collision.

At least one of the imaging units 12101 to 12104 may be an infrared camera that detects infrared rays. For example, the microcomputer 12051 can recognize a pedestrian by determining whether there is a pedestrian in captured images of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating the outline of the object and it is determined whether the object is a pedestrian. When the microcomputer 12051 determines that there is a pedestrian in the captured images of the imaging units 12101 to 12104, and the pedestrian is recognized, the audio/image output unit 12052 controls the display unit 12062 such that the recognized pedestrian is displayed with a square contour line for emphasis superimposed thereon. In addition, the audio/image output unit 12052 may control the display unit 12062 such that an icon indicating a pedestrian or the like is displayed at a desired position.

An example of the vehicle control system to which the technology according to the present disclosure may be applied has been described above. The technology according to the present disclosure may be applied to, for example, the imaging unit 12031 among the configurations described above. Specifically, the imaging device 100 in FIG. 1 can be applied to the imaging unit 12031. By applying the technology according to the present disclosure to the imaging unit 12031, power consumption of the column amplifier can be curbed and thus power consumption of the entire vehicle system can be reduced.

Meanwhile, the above-described embodiments show examples for embodying the present technology, and matters in the embodiments and matters specifying the invention in the claims have a corresponding relationship with each other. Similarly, the matters specifying the invention in the claims and the matters in the embodiments of the present technology having the same name have a corresponding relationship with each other. However, the present technology is not limited to the embodiments and can be embodied by applying various modifications to the embodiments without departing from the gist thereof.

The effects described in the present specification are merely examples and are not intended as limiting, and other effects may be obtained.

The present technology can also have the following configurations.

(1) A solid-state imaging element including
   a pixel circuit that generates an input voltage by photoelectric conversion,
   an input transistor that outputs an output voltage depending on a voltage between a source to which the input voltage is input and a gate from a drain,
   a reference side current source that is connected to a reference node at a predetermined reference voltage and supplies a predetermined current, and
   a feedback circuit that feeds back a part of the current to the gate of the input transistor.

(2) The solid-state imaging element according to (1), wherein the feedback circuit includes
   a feedback capacitance inserted between an output node through which the output voltage is output and the gate,
   a reference side capacitance inserted between the gate and the reference node at the reference voltage, and
   an input side auto-zero switch that opens and closes a path between the gate and the output node.

(3) The solid-state imaging element according to (2), further including
a cascode transistor inserted between the reference side current source and the drain, and
a cascode capacitance inserted between the source of the input transistor and a gate of the cascode transistor,
wherein the output node is a node between the cascode transistor and the reference side current source.

(4) The solid-state imaging element according to (2), further including
a power supply side current source connected to a power supply node at a predetermined power supply voltage, and
a pair of cascode transistors inserted between the power supply side current source and the reference side current source,
wherein the output node is a node between the pair of cascode transistors.

(5) The solid-state imaging element according to (4), further including
an intermediate switch that opens and closes a path between the feedback capacitance and the output node, and
a reference switch that opens and closes a path between the feedback capacitance and a node at a predetermined reference voltage.

(6) The solid-state imaging element according to (4), further including
a cascode capacitance connected to the power supply node at the power supply voltage,
an output side auto-zero switch that opens and closes a path between the cascode capacitance and the output node, and
an intermediate switch,
wherein the reference side current source includes a first reference side current source transistor and a second reference side current source transistor,
the first reference side current source transistor is inserted between the input transistor and the reference node,
the second reference side current source transistor is inserted between one of the pair of cascode transistors and the reference node at the reference voltage, and the intermediate switch opens and closes a path between a node between the input transistor and the first reference side current source transistor and a node between one of the pair of cascode transistors and the second reference side current source transistor.

(7) The solid-state imaging element according to any one of (1) to (6), further including
a boost side current source connected to a power supply node at a predetermined power supply voltage,
a boost transistor inserted between the boost side current source and the reference node at the reference voltage and having a gate connected to an output node through which the output voltage is output, and
a boost side capacitance inserted between a node between the boost side current source and the boost transistor and the source.

(8) An imaging device including
a pixel circuit that generates an input voltage by photoelectric conversion,
an input transistor that outputs an output voltage depending on a voltage between a source to which the input voltage is input and a gate from a drain,
a reference side current source that is connected to a node at a predetermined reference voltage and supplies a predetermined current,
a feedback circuit that feeds back a part of the current to the gate of the input transistor, and
an analog-to-digital converter that converts the output voltage into a digital signal.

REFERENCE SIGNS LIST

100 Imaging device
110 Optical unit
120 DSP circuit
130 Display unit
140 Operation unit
150 Bus
160 Frame memory
170 Storage unit
180 Power supply unit
200 Solid-state imaging element
201 Pixel chip
202 Circuit chip
210 Row selection unit
220 DAC
230 Timing control circuit
240 Pixel array part
250 Pixel circuit
251 Photoelectric conversion element
252 Transfer transistor
253 Reset transistor
254 Floating diffusion layer
255 Amplification transistor
256 Select transistor
260 Analog-to-digital conversion unit
261 ADC
262, 263, 503 Capacitance
264 Comparator
265 Counter
266 Latch circuit
270 Horizontal transfer scanning unit
280 Image processing unit
300 Constant current source unit
310, 500 Column amplifier
320 Power reuse column amplifier
321 Input stage
322, 505 Input transistor
323 Feedback circuit
324 Input side auto-zero switch
325, 504 Feedback capacitance
326 Reference side capacitance
327, 347 Reference side current source transistor
330, 346 Intermediate switch
330-1 Reference switch
331, 341 Cascode capacitance
332, 343, 345, 353 Cascode transistor
333 Cascode side auto-zero switch
340 Folded stage
342 Power supply side current source transistor
344 Output side auto-zero switch
350 Boost circuit
351 Boost side capacitance
352 Boost side current source transistor
354 Boost transistor
400 VSL capacitance
401 Load capacitance
501 Current source
502 Auto-zero switch
12031 Imaging unit

The invention claimed is:

1. A solid-state imaging element comprising:
   a pixel circuit that generates an input voltage by photoelectric conversion;
   an input transistor including a gate, a source and a drain, the source receiving the input voltage, the drain outputting an output voltage that depends on a voltage between the gate and the source;
   a reference side current source that is connected to a reference node at a reference voltage and that supplies a current; and
   a feedback circuit that feeds back at least a part of the current to the gate of the input transistor.

2. The solid-state imaging element according to claim 1, wherein
   the feedback circuit includes a feedback capacitance inserted between an output node through which the output voltage is output and the gate of the input transistor, a reference side capacitance inserted between the gate of the input transistor and the reference node, and an input side auto-zero switch that opens and closes a path between the gate of the input transistor and the output node.

3. The solid-state imaging element according to claim 2, further comprising:
   a cascode transistor inserted between the reference side current source and the drain; and
   a cascode capacitance inserted between the source of the input transistor and a gate of the cascode transistor, wherein
   the output node is between the cascode transistor and the reference side current source.

4. The solid-state imaging element according to claim 2, further comprising:
   a power supply side current source connected to a power supply node at a power supply voltage; and
   a pair of cascode transistors inserted between the power supply side current source and the reference side current source, wherein the output node is between the pair of cascode transistors.

5. The solid-state imaging element according to claim 4, further comprising:
   an intermediate switch that opens and closes a path between the feedback capacitance and the output node; and
   a reference switch that opens and closes a path between the feedback capacitance and a node at the reference voltage.

6. The solid-state imaging element according to claim 4, further comprising:
   a cascode capacitance connected to the power supply node at the power supply voltage;
   an output side auto-zero switch that opens and closes a path between the cascode capacitance and the output node; and
   an intermediate switch, wherein
   the reference side current source includes a first reference side current source transistor and a second reference side current source transistor,
   the first reference side current source transistor is inserted between the input transistor and the reference node,
   the second reference side current source transistor is inserted between one of the pair of cascode transistors and the reference node at the reference voltage, and the intermediate switch opens and closes a path between a first node between the input transistor and the first reference side current source transistor and a second node between one of the pair of cascode transistors and the second reference side current source transistor.

7. The solid-state imaging element according to claim 1, further comprising:
   a boost side current source connected to a power supply node at a power supply voltage;
   a boost transistor inserted between the boost side current source and the reference node at the reference voltage and having a gate connected to an output node through which the output voltage is output, and
   a boost side capacitance inserted between another node between the boost side current source and the boost transistor and the source.

8. An imaging device comprising:
   a pixel circuit that generates an input voltage by photoelectric conversion;
   an input transistor including a gate, a source and a drain, the source receiving the input voltage, the drain outputting an output voltage that depends on a voltage between the gate and the source;
   a reference side current source that is connected to a reference node at a reference voltage and that supplies a current;
   a feedback circuit that feeds back at least a part of the current to the gate of the input transistor; and
   an analog-to-digital converter that converts the output voltage into a digital signal.

9. The imaging device according to claim 8, wherein
   the feedback circuit includes a feedback capacitance inserted between an output node through which the output voltage is output and the gate of the input transistor, a reference side capacitance inserted between the gate of the input transistor and the reference node, and an input side auto-zero switch that opens and closes a path between the gate of the input transistor and the output node.

10. The imaging device according to claim 9, further comprising:
    a cascode transistor inserted between the reference side current source and the drain; and
    a cascode capacitance inserted between the source of the input transistor and a gate of the cascode transistor, wherein
    the output node is between the cascode transistor and the reference side current source.

11. The imaging device according to claim 9, further comprising:
    a power supply side current source connected to a power supply node at a power supply voltage; and
    a pair of cascode transistors inserted between the power supply side current source and the reference side current source, wherein the output node is between the pair of cascode transistors.

12. The imaging device according to claim 11, further comprising:
    an intermediate switch that opens and closes a path between the feedback capacitance and the output node; and
    a reference switch that opens and closes a path between the feedback capacitance and a node at the reference voltage.

13. The imaging device according to claim 11, further comprising:
    a cascode capacitance connected to the power supply node at the power supply voltage;

an output side auto-zero switch that opens and closes a path between the cascode capacitance and the output node; and an intermediate switch, wherein the reference side current source includes a first reference side current source transistor and a second reference side current source transistor, the first reference side current source transistor is inserted between the input transistor and the reference node, the second reference side current source transistor is inserted between one of the pair of cascode transistors and the reference node at the reference voltage, and the intermediate switch opens and closes a path between a first node between the input transistor and the first reference side current source transistor and a second node between one of the pair of cascode transistors and the second reference side current source transistor.

14. The imaging device according to claim 8, further comprising:

a boost side current source connected to a power supply node at a power supply voltage;

a boost transistor inserted between the boost side current source and the reference node at the reference voltage and having a gate connected to an output node through which the output voltage is output, and a boost side capacitance inserted between another node between the boost side current source and the boost transistor and the source.

* * * * *